US012684105B2

(12) United States Patent
Lee et al.

(10) Patent No.: US 12,684,105 B2
(45) Date of Patent: Jul. 14, 2026

(54) ELECTRONIC DEVICE FOR PROVIDING ADDITIONAL IMAGE AND OPERATING METHOD THEREOF

(71) Applicant: KT&G CORPORATION, Daejeon (KR)

(72) Inventors: Wonkyeong Lee, Guri-si (KR); Min Kyu Kim, Seoul (KR); Paul Joon Sunwoo, Seoul (KR)

(73) Assignee: KT&G CORPORATION, Daejeon (KR)

( * ) Notice: Subject to any disclaimer, the term of this patent is extended or adjusted under 35 U.S.C. 154(b) by 117 days.

(21) Appl. No.: 18/289,248

(22) PCT Filed: Aug. 21, 2023

(86) PCT No.: PCT/KR2023/012313
§ 371 (c)(1),
(2) Date: Nov. 2, 2023

(87) PCT Pub. No.: WO2024/063344
PCT Pub. Date: Mar. 28, 2024

(65) Prior Publication Data
US 2025/0106378 A1     Mar. 27, 2025

(30) Foreign Application Priority Data
Sep. 20, 2022     (KR) ........................ 10-2022-0118727

(51) Int. Cl.
*H04N 13/361*          (2018.01)
*A24F 40/53*          (2020.01)
(Continued)

(52) U.S. Cl.
CPC ........... *H04N 13/361* (2018.05); *A24F 40/53* (2020.01); *A24F 40/60* (2020.01); *A24F 40/65* (2020.01)

(58) Field of Classification Search
CPC ......... G06F 3/01; G06F 3/011; H04N 13/361; G02B 27/017; G02B 27/0172; A61M 15/06; A24F 40/00
See application file for complete search history.

(56) References Cited

U.S. PATENT DOCUMENTS 10,058,122 B2 *   8/2018   Steingraber ............. A24F 40/60
2018/0031837 A1 *   2/2018   Fan-Chiang ....... G02B 27/0172
(Continued)

FOREIGN PATENT DOCUMENTS

JP        2019-508026 A        3/2019
KR     10-2008-0014742 A        2/2008
(Continued)

OTHER PUBLICATIONS

"LetinAR Launches Breakthrough Augmented Reality Optic Technology at MWC 2018", Arpost, Wednesday, Mar. 7, 2018, pp. 1-9.
(Continued)

*Primary Examiner* — Yuzhen Shen
(74) *Attorney, Agent, or Firm* — Sughrue Mion, PLLC

(57)          ABSTRACT

To provide an additional image to a user, an electronic device receives data on a smoking event from an external device, generates image data including at least one graphic object corresponding to the smoking event based on data on the received smoking event, and provides an additional image to a user by outputting the image data on a display, wherein the additional image and a real scene corresponding to a field of view of the user are simultaneously observed by the user through the display.

10 Claims, 16 Drawing Sheets

(51) Int. Cl.
  *A24F 40/60* (2020.01)
  *A24F 40/65* (2020.01)

(56) References Cited

U.S. PATENT DOCUMENTS

| | | | |
|---|---|---|---|
| 2019/0000147 A1* | 1/2019 | Koc | A24F 40/65 |
| 2019/0295304 A1* | 9/2019 | Janardhan | G06T 13/205 |
| 2022/0171190 A1* | 6/2022 | Trisnadi | H04N 13/398 |

FOREIGN PATENT DOCUMENTS

| | | |
|---|---|---|
| KR | 10-2010-0115679 A | 10/2010 |
| KR | 10-2014-0066258 A | 5/2014 |
| KR | 10-2014-0134945 A | 11/2014 |
| KR | 10-2018-0012182 A | 2/2018 |
| KR | 10-2021-0042754 A | 4/2021 |

OTHER PUBLICATIONS

Communication issued Dec. 3, 2024 in Japanese Application No. 2023-578834.
International Search Report dated Dec. 20, 2023 in International Application No. PCT/KR2023/012313.
Office Action issued Jan. 22, 2025 in Korean Patent Application No. 10-2022-0118727.
Extended European Search Report dated Mar. 23, 2026, issued in European application No. 23789212.0.

* cited by examiner

610

600a

620

600b

1230

From 1420

From 1420

From 1420

ELECTRONIC DEVICE FOR PROVIDING ADDITIONAL IMAGE AND OPERATING METHOD THEREOF

TECHNICAL FIELD

The following embodiments relate to a method of providing an additional image to a user, and more particularly, a method of providing, to a user, an additional image for augmented reality through a display.

BACKGROUND ART

The demand for electronic cigarettes, or e-cigarettes, has recently been on the rise. The rising demand for e-cigarettes has accelerated the continued development of e-cigarette related functions. The e-cigarette related functions may include, in particular, functions according to types and characteristics of e-cigarettes.

DISCLOSURE OF THE INVENTION

Technical Goals

An example embodiment provides an electronic device for providing an additional image to a user.

An example embodiment provides a method of providing an additional image, performed by an electronic device.

Technical Solutions

According to an example embodiment, an electronic device includes a communication module configured to perform communication with an external device, a display, and a processor electrically connected to the communication module and the display, wherein the processor is configured to receive data on a smoking event from the external device through the communication module, generate image data including at least one graphic object corresponding to the smoking event based on the data on the smoking event, and output the image data through the display.

An optical path of an additional image displayed by outputting the image data corresponds to an optical path of a real scene passing through the display.

The data on the smoking event includes data on an acceleration change or a pressure change sensed by a sensor of the external device.

The electronic device further includes a microphone module configured to obtain external audio data, wherein the processor is further configured to, when the data on the smoking event is received from the external device, activate the microphone module, receive the external audio data obtained through the activated microphone module, and generate the image data including at least one graphic object corresponding to the smoking event based on the received data on the smoking event and the received external audio data.

The electronic device further includes a sensing module including at least one sensor, wherein the processor is further configured to obtain sensing data on at least one of whether the external device approaches, a change in a lip shape of a user of the electronic device, and movement of the electronic device through the sensing module, and generate the image data including at least one graphic object corresponding to the smoking event based on the data on the received smoking event and the obtained sensing data.

The processor is further configured to determine an output timepoint of the image data based on the data on the smoking event, and control the display to display an additional image by outputting the image data at the output timepoint.

The processor is further configured to determine a first timepoint at which a user of the electronic device performs a first motion, determine a second timepoint at which the user performs a second motion after the first timepoint, and determine the output timepoint of the image data based on an interval between the first timepoint and the second timepoint.

The processor is further configured to predict an inhalation duration based on the interval between the first timepoint and the second timepoint, predict a start timepoint of exhalation based on the inhalation duration and the interval between the first timepoint and the second timepoint, and determine the start timepoint of exhalation to be the output timepoint of the image data.

The display includes a beam output device, and a half mirror.

The display includes an exit pupil expander (EPE) device.

The external device includes an electronic cigarette.

According to an example embodiment, a method of outputting an additional image, performed by an electronic device, the method includes receiving data on a smoking event from an external device, generating image data including at least one graphic object corresponding to the smoking event based on data on the received smoking event, and displaying an additional image by outputting the image data on a display.

Effects

An electronic device for displaying an additional image over a view of a real world may be provided.

A method of providing an additional image, performed by an electronic device, may be provided.

BEST MODE FOR CARRYING OUT THE INVENTION

Figure 1:
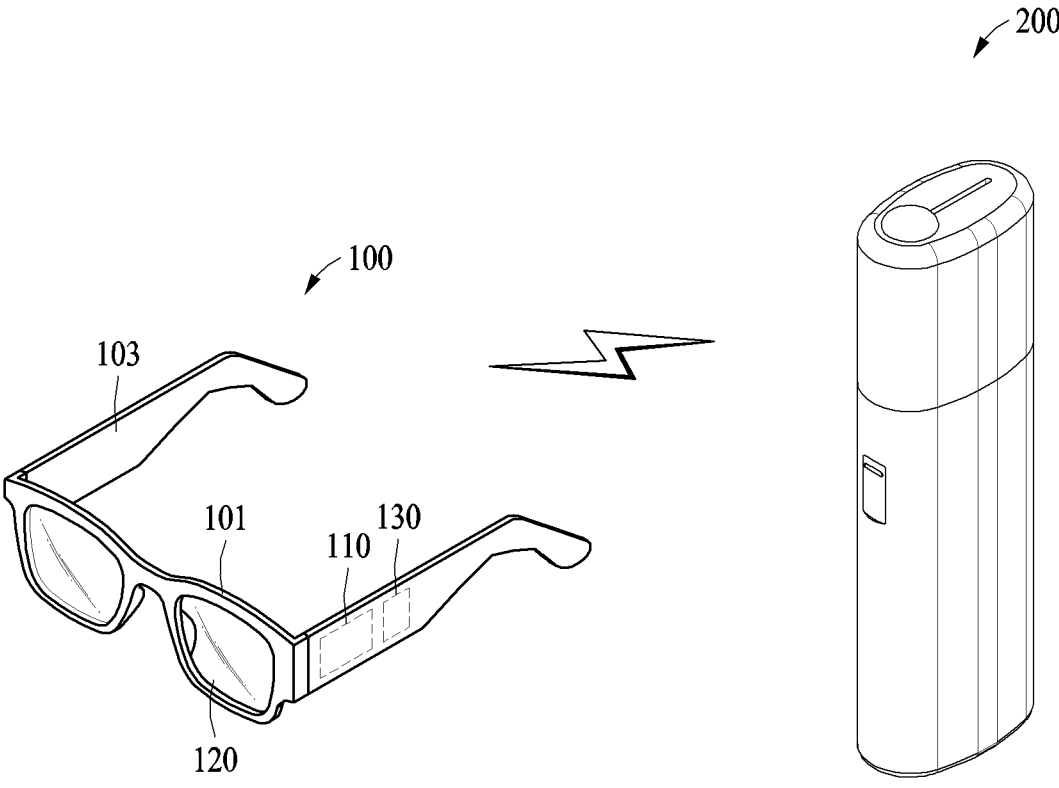
FIG. 1 illustrates a schematic diagram of a smokeless inhalation system according to an example.

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if one component is described as being "connected", "coupled", or "joined" to another component, a third component may be "connected", "coupled", and "joined" between the first and second components, although the first component may be directly connected, coupled, or joined to the second component.

The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, examples will be described in detail with reference to the accompanying drawings. When describing the examples with reference to the accompanying drawings, like reference numerals refer to like components and a repeated description related thereto will be omitted.

FIG. 1 illustrates a schematic diagram of a smokeless inhalation system according to an example.

Referring to FIG. 1, the smokeless inhalation system may include an electronic device 100 and a smokeless inhalation instrument 200. Herein, the electronic device 100 may be an electronic device that is wearable by a user. For example, the electronic device 100 may correspond to a wearable head-mounted display (HMD) (e.g., an augmented reality (AR) glass or a virtual reality (VR) device) in the form of glasses or goggles. Herein, the smokeless inhalation instrument 200 may be a device that transmits nicotine (or tobacco flavor) to a user yet does not generate smoke. For example, the smokeless inhalation instrument 200 may be formed in the same or similar exterior to a conventional aerosol generating device. In addition, smokeless tobacco in a shape that is the same as a conventional aerosol generating article may be inserted into (or removed from) the smokeless inhalation instrument 200. However, the exterior of the smokeless inhalation instrument 200 and the shape of insertable (or removable) smokeless tobacco are not limited thereto and modification thereof depending on the design of a manufacturer is obvious to one of ordinary skill in the art.

In one embodiment, an electronic device 100 may include a face plate 101 and a mounting part 103.

In one embodiment, the face plate 101 of the electronic device 100 may be worn on at least a portion of the front of the face of a user. For example, the face plate 101 may include various components (e.g., a nose pad) that may be supported by at least a part (e.g., the bridge of the nose) of the front of the face of the user.

In one embodiment, the mounting part 103 of the electronic device 100 may be combined with a portion of the face plate 101 and may be supported by a body part (e.g., an ear) of the user. For example, the mounting part 103 may include a temple, a strap, or a helmet such that the face plate 101 may closely contact around the eyes of the user.

In one embodiment, the electronic device 100 may include a processor 110, a display 120, and a communication module 130. The electronic device 100 may further include a sensor (e.g., a camera). In one embodiment, the processor 110 and the communication module 130 may be disposed on at least a portion of the mounting part 103 of the electronic device 100. However, the portion where the processor 110 and the communication module 130 are disposed is not limited thereto. In another embodiment, at least one of the processor 110 and the communication module 130 may be disposed on a portion excluding the display 120 portion in the face plate 101 of the electronic device 100. In one embodiment, the display 120 may be disposed on the face plate 101 of the electronic device 100 because the display 120 may be a lens of glasses.

In one embodiment, the electronic device 100 and the smokeless inhalation instrument 200 may connect and communicate via a communication interface. For example, the communication module 130 of the electronic device 100 may be connected to a network via wireless communication or wired communication and may communicate with the smokeless inhalation instrument 200. The wireless communication may include wireless fidelity (Wi-Fi), Bluetooth (BT), near field communication (NFC), or cellular communication (e.g., long-term evolution (LTE), LTE-A, code division multiple access (CDMA), wideband code division multiple access (WCDMA), and universal mobile telecommunication system (UMTS)). The wired communication may include at least one of universal serial bus (USB) and high definition multimedia interface (HDMI).

In one embodiment, the electronic device 100 may generate image data based on data received from the smokeless inhalation instrument 200 through the communication module 130 and may provide various images to a user by outputting the image data through the display 120. A detailed description thereof is provided below.

Figure 2:
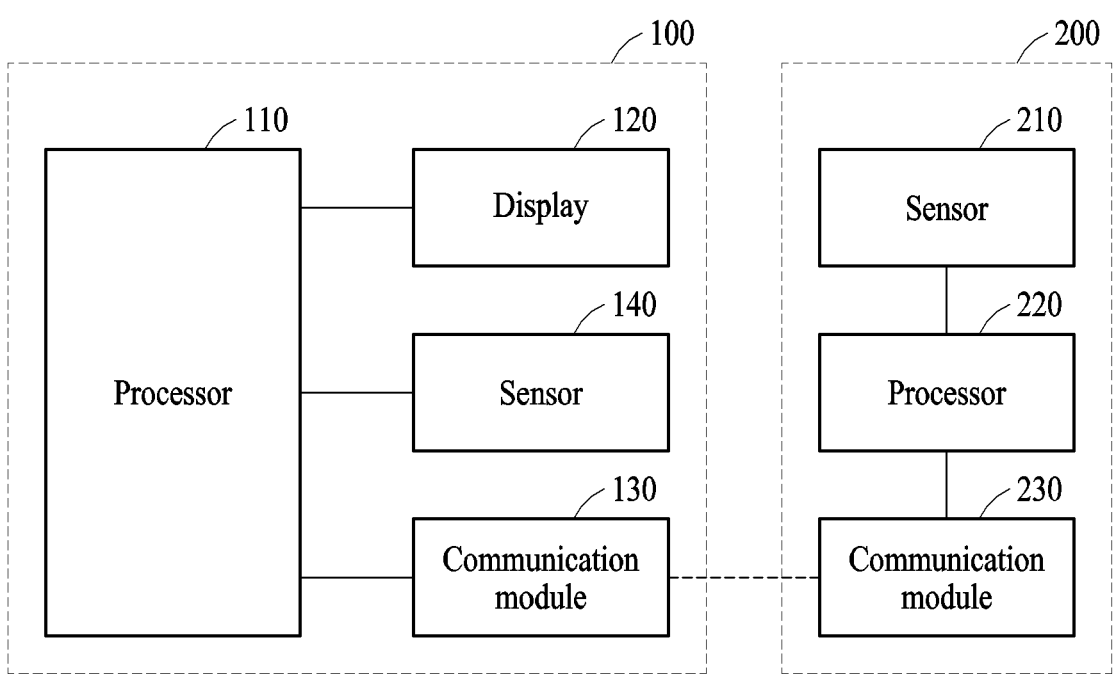
FIG. 2 illustrates a block diagram of an electronic device and a smokeless inhalation instrument according to an example.

FIG. 2 illustrates a block diagram of an electronic device and a smokeless inhalation instrument according to an example.

According to one embodiment, the electronic device 100 described with reference to FIG. 1 may include the processor 110, the display 120, the communication module 130, and a sensor 140.

According to one embodiment, the smokeless inhalation instrument 200 described with reference to FIG. 1 may include a sensor 210, a processor 220, and a communication module 230.

In one embodiment, the processor 220 of the smokeless inhalation instrument 200 may sense a smoking event of a user. Herein, the "smoking event" may refer to a user's puff sensed by a sensor included in the smokeless inhalation instrument 200. That is, as a user's inhalation through smokeless tobacco inserted into the smokeless inhalation instrument 200 is sensed, the processor 220 of the smokeless inhalation instrument 200 may sense the occurrence of a smoking event.

In one embodiment, the processor 220 of the smokeless inhalation instrument 200 may sense an occurrence of a smoking event through the sensor 210. For example, when a pressure change (e.g., pressure drop) detected through the sensor 210 is greater than a preset threshold value, the processor 220 may sense an occurrence of a smoking event. In one embodiment, the processor 220 of the smokeless inhalation instrument 200 may transmit data on the smoking event to the electronic device 100 through the communication module 230.

In one embodiment, the processor 110 of the electronic device 100 may receive data from the smokeless inhalation instrument 200 through the communication module 130. For example, the communication module 130 of the electronic device 100 may perform communication connection with the communication module 230 of the smokeless inhalation instrument 200 and may receive data on the smoking event from the smokeless inhalation instrument 200. In one embodiment, when power of the smokeless inhalation instrument 200 is turned on, the electronic device 100 may automatically establish a communication link with the communication module 230 of the smokeless inhalation instrument 200 through the communication module 130. For example, when a smoking event is sensed through the sensor 210 of the smokeless inhalation instrument 200 after a communication link between the electronic device 100 and the smokeless inhalation instrument 200 is established, the electronic device 100 may receive data on the smoking event from the smokeless inhalation instrument 200 through the communication module 130. As another example, when a smoking event is not sensed through the sensor 210 of the smokeless inhalation instrument 200 within a threshold time (e.g., 15 seconds) after a communication connection between the electronic device 100 and the smokeless inhalation instrument 200 is established, the electronic device 100 may disconnect a communication link with the smokeless inhalation instrument 200. When the communication link between the electronic device 100 and the smokeless inhalation instrument 200 is disconnected, power of the smokeless inhalation instrument 200 may be turned off.

In one embodiment, the processor 110 of the electronic device 100 may generate image data on a smoking event received from the smokeless inhalation instrument 200 and may provide an additional image (i.e., image data on a smoking event) to a user through the display 120. In this case, the additional image may include at least one graphic object (e.g., a smoke object) corresponding to the smoking event. For example, the processor 110 may provide an additional image to a user after a timepoint when a pressure drop in the smokeless inhalation instrument 200 is finished and the additional image may include a smoke object corresponding to exhalation of the user. In this case, the "timepoint when a pressure drop is finished" may be a timepoint when an inhalation ends in a time period corresponding to one puff action by a user. As such, although the user smoking through the smokeless inhalation instrument 200 may not visually observe cigarette smoke in reality, smoking satisfaction of the user may increase by an additional image visualizing smoke with a smoke object.

Figure 3:
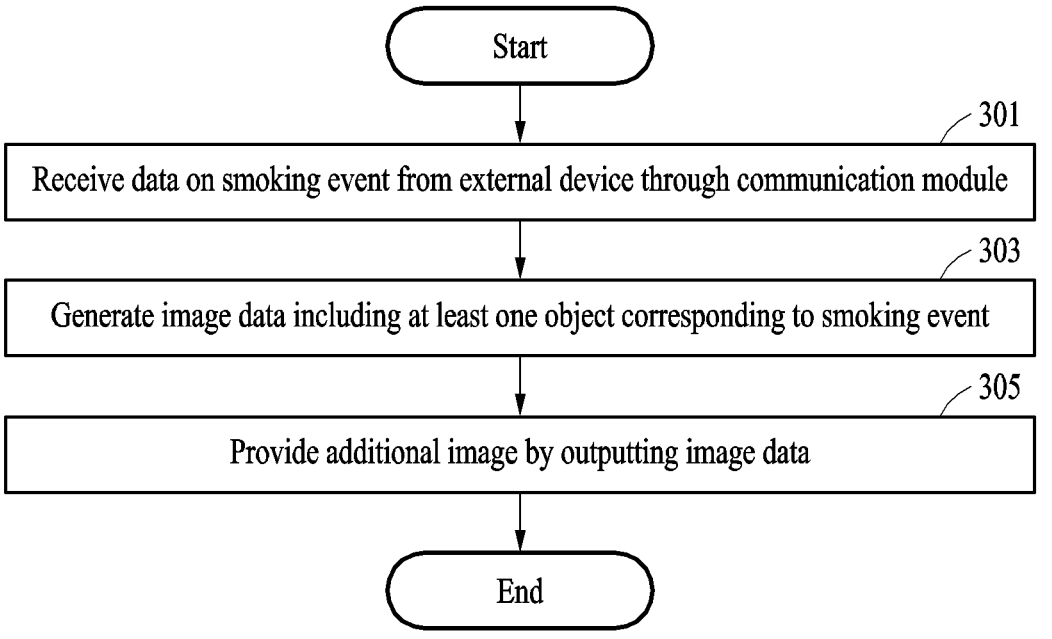
FIG. 3 illustrates a flowchart of a method of providing an additional image, according to an example.
Figure 4:
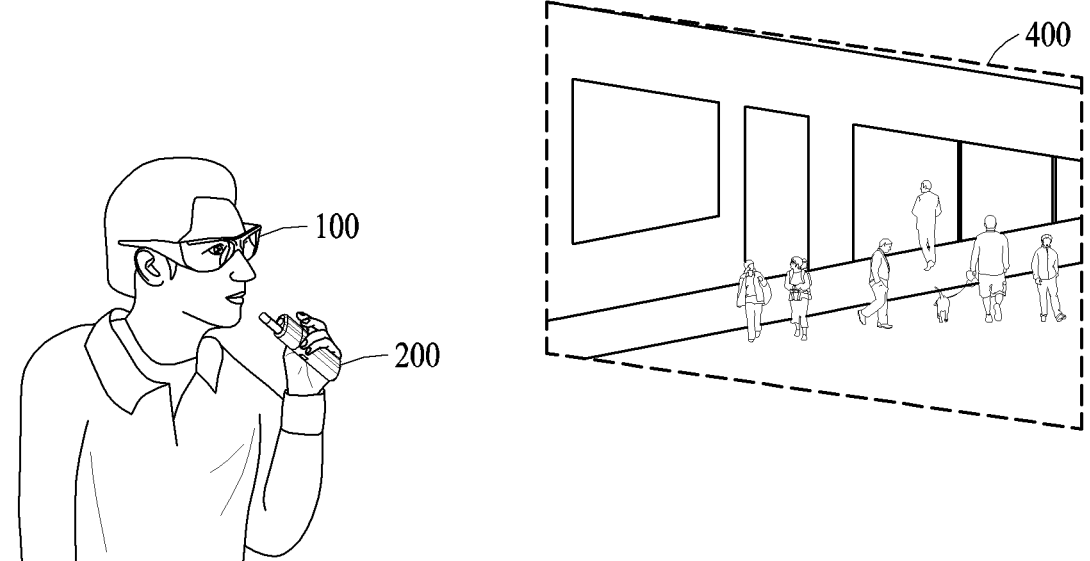
FIG. 4 illustrates a first state of a display of an electronic device according to an example.
Figure 5:
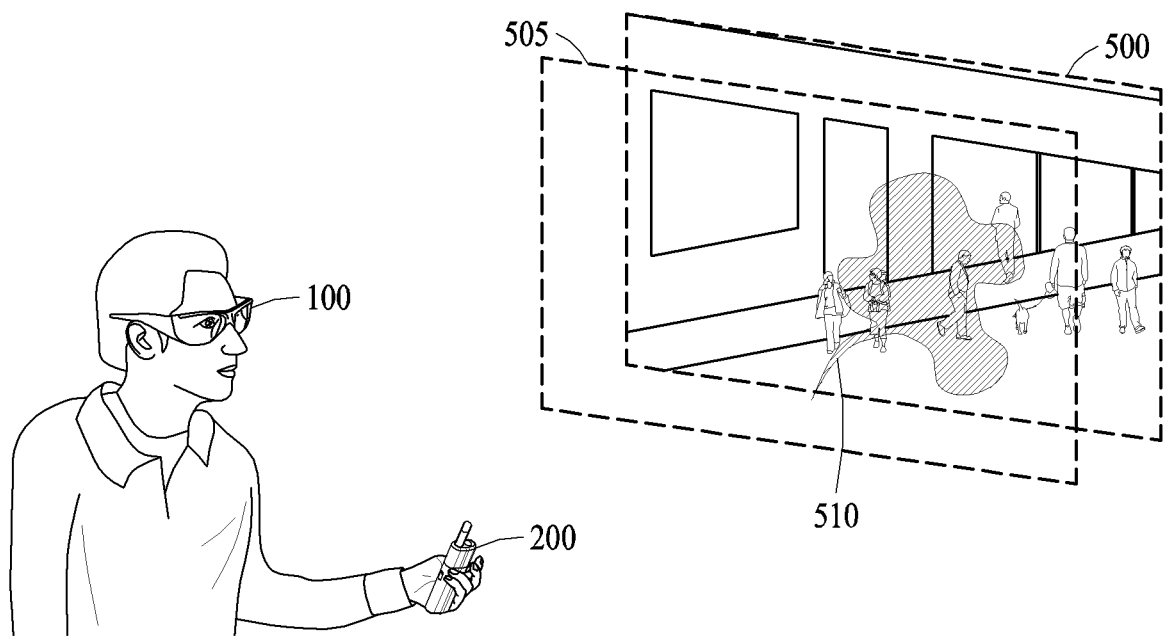
FIG. 5 illustrates a second state of the display of the electronic device according to an example.

FIG. 3 illustrates a flowchart of a method of providing an additional image, according to an example. FIG. 4 illustrates a first state of a display of an electronic device according to an example. FIG. 5 illustrates a second state of the display of the electronic device according to an example.

According to one embodiment, an electronic device may provide an additional image to a user through operations 301, 303, and 305.

In operation 301, a processor (e.g., the processor 110 of FIG. 2) of an electronic device (e.g., the electronic device 100 of FIG. 2) may receive data on a smoking event from an external device (e.g., the smokeless inhalation instrument 200 of FIG. 2) through a communication module (e.g., the communication module 130 of FIG. 2). The external device may be an electronic cigarette.

For example, referring to FIG. 4, as a user wears the electronic device 100 on their body part (e.g., the head), the user may observe a scene 400 in reality corresponding to a field of view (FOV) of the user through a display (e.g., display 120 of FIG. 2). In this case, the display 120 may be a transparent lens in a state in which an additional image is not output. Accordingly, the scene 400 in reality that the user is able to see through the display 120 may be a surrounding environment in a real space in which the user smokes through the smokeless inhalation instrument 200. Thereafter, when the user inhales smokeless tobacco through the smokeless inhalation instrument 200 while the user wears the electronic device 100, the processor 110 of the electronic device 100 may receive data on a smoking event from the smokeless inhalation instrument 200.

According to one embodiment, a processor (e.g., the processor 220 of FIG. 2) of the smokeless inhalation instrument 200 may sense a pressure change through a pressure sensor (e.g., the sensor 210 of FIG. 2) and may determine the timepoint at which the pressure change is initially sensed through the sensor 210 to be a timepoint $t_1$ when the user starts to inhale through the smokeless tobacco. The processor 220 of the smokeless inhalation instrument 200 may transmit, to the electronic device 100, data indicating an occurrence of a smoking event corresponding to the pressure change at the timepoint $t_1$.

According to one embodiment, when the user finishes one inhalation of smokeless tobacco, the processor 110 of the electronic device 100 may receive data on the end of the smoking event from the smokeless inhalation instrument 200. For example, the processor 220 of the smokeless inhalation instrument 200 may determine the timepoint when a pressure change (e.g., pressure drop) sensed through the sensor 210 no longer occurs to be a timepoint $t_2$ when the user finishes one inhalation through smokeless tobacco. The processor 220 of the smokeless inhalation instrument 200 may transmit data on the end of the pressure change at the timepoint $t_2$ to the electronic device 100.

In one embodiment, the processor 110 of the electronic device 100 may generate image data to output based on the time difference between the timepoint $t_1$ and the timepoint $t_2$. In one embodiment, the processor 110 of the electronic device 100 may generate image data based on the degree of pressure change from the timepoint $t_1$ to the timepoint $t_2$. A detailed description thereof is provided with reference to FIG. 6.

As described above, although the description is provided that the smoking event is a smoking event is detected based on a pressure change in the smokeless inhalation instrument 200, the smoking event may be detected by various sensors. Various embodiments related to a smoking event are described with reference to FIGS. 15 to 17 below.

In operation 303, the processor 110 of the electronic device 100 may generate image data including at least one graphic object corresponding to the smoking event. The image data may be data on a video continuously outputting graphic objects. When the image data is output through the display 120, the video provided to the user may be referred to as an additional image 505. For example, while the additional image 505 is output, the shape of a graphic object 510 may change. According to one embodiment, the graphic object 510 may be the shape of cigarette smoke.

According to one embodiment, the processor 110 may determine a duration of the additional image 505 based on the data received from the smokeless inhalation instrument 200 and may determine the shape of the graphic object 510 output in the additional image 505. For example, the duration of the additional image 505 may correspond to a predicted (or determined) exhalation duration of the user. A method of determining an exhalation duration of a user is described with reference to FIG. 14 below.

In operation 305, the processor 110 of the electronic device 100 may provide the additional image 505 to the user by outputting the image data generated in operation 303 through the display 120.

According to the example shown in FIG. 5, as the user exhales after inhaling through smokeless tobacco, the user may observe, on the display 120, a screen in which the additional image 505 overlaps a scene 500 in reality. In this case, the electronic device 100 may output light related to the image data to the display 120 through a separate beam output device disposed on a mounting part (e.g., the mounting part 103 of FIG. 1). The additional image 505 provided to the user may include the graphic object 510 corresponding to cigarette smoke that may occur when smoking a conventional cigarette (smoke tobacco).

Figure 6:
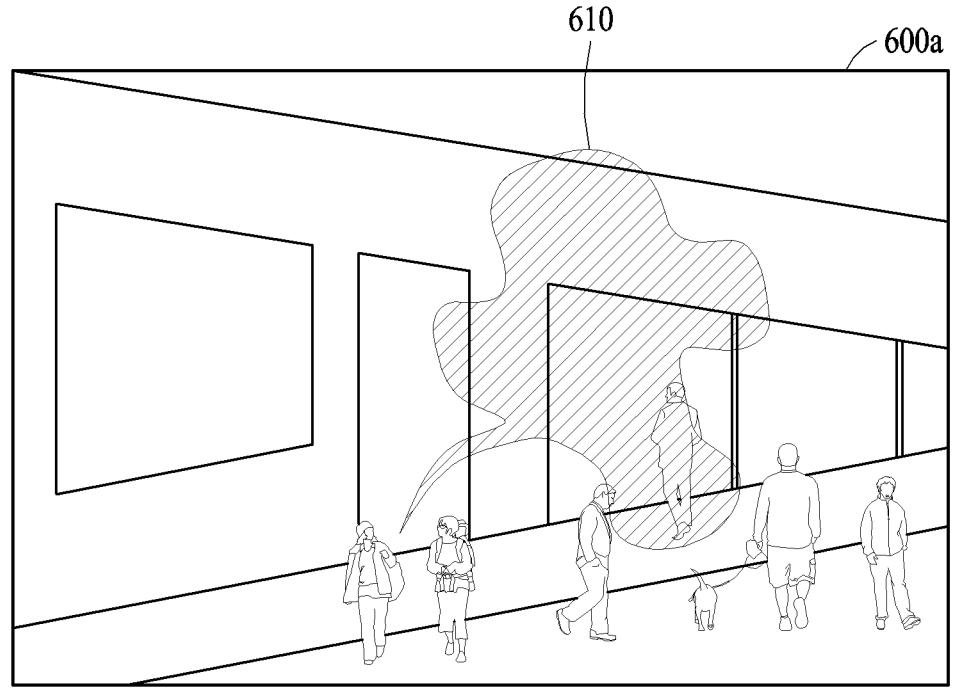
FIG. 6 illustrates a state of a display of an electronic device in response to inhalation of a smokeless inhalation instrument according to an example.
Figure 6:
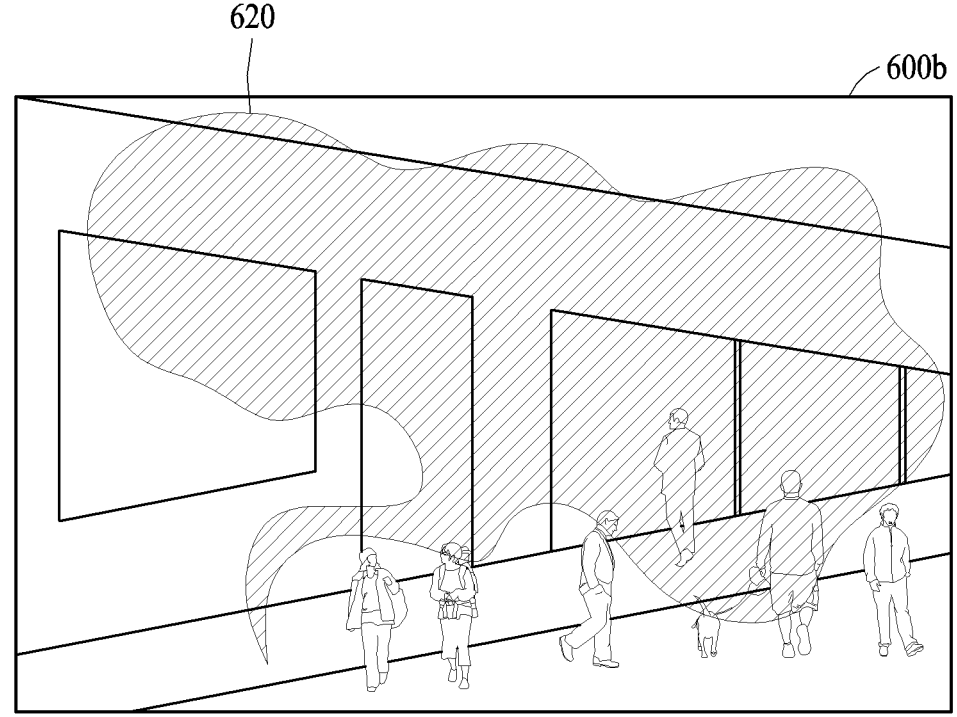

FIG. 6 illustrates a state of a display of an electronic device in response to inhalation of a smokeless inhalation instrument according to an example.

Referring to FIG. 6, the processor 110 of the electronic device 100 described with reference to FIG. 1 may provide, on the display 120, additional images 610 and 620 corresponding to a smoking event to a user.

According to one embodiment, the processor 110 may generate image data for the additional images 610 and 620 based on the degree of inhalation by the user. For example, the data on the smoking event received by the electronic device 100 from the smokeless inhalation instrument 200 of FIG. 1, which is an external device, may include data on the degree of inhalation by the user and the processor 110 of the electronic device 100 may generate image data corresponding to the degree of inhalation by the user.

According to one embodiment, the electronic device 100 may receive, from the smokeless inhalation instrument 200, data on a pressure change as the data on the degree of inhalation by the user and may output, on the display 120, image data corresponding to the received data on the pressure change.

For example, the data on the degree of inhalation received by the electronic device 100 from the smokeless inhalation instrument 200 may include a first inhalation pressure (a negative value). That is, as the user inhales through a mouthpiece part of the smokeless inhalation instrument 200, a sensor (e.g., the sensor 210 of FIG. 2) disposed on the airflow path of the smokeless inhalation instrument 200 may sense pressure drop in the path. In this case, the first inhalation pressure may be a pressure change value that is detected when the user substantially and lightly inhales through the mouthpiece part of the smokeless inhalation instrument 200.

The electronic device 100 may generate image data corresponding to the first inhalation pressure. For example, the electronic device 100 may determine image data corresponding to the first inhalation pressure based on data pre-stored in a memory (not shown). In this case, the memory of the electronic device 100 may pre-store image data corresponding to a pressure value. Thereafter, the electronic device 100 may provide the additional image 610 to the user by outputting, on the display 120, the image data corresponding to the determined first inhalation pressure when the first inhalation pressure is detected. For example, the user may view, on the display 120, a screen on which the additional image 610 corresponding to the determined first inhalation pressure overlaps a scene 600a in reality.

As another example, the data on the degree of inhalation received by the electronic device 100 from the smokeless inhalation instrument 200 may include a second inhalation pressure (a negative value). That is, as the user inhales through a mouthpiece part of the smokeless inhalation instrument 200, the sensor 210 disposed on the airflow path of the smokeless inhalation instrument 200 may sense pressure drop in the path. In this case, the second inhalation pressure may be a pressure change value that is detected when the user substantially and strongly inhales through the mouthpiece part of the smokeless inhalation instrument 200. In addition, the absolute value of the second inhalation pressure may be greater than the absolute value of the first inhalation pressure.

The electronic device 100 may determine image data corresponding to the second inhalation pressure. For example, the electronic device 100 may determine image data corresponding to the second inhalation pressure based on data pre-stored in a memory (not shown). Thereafter, the electronic device 100 may provide the additional image 620 to the user by outputting, on the display 120, the image data corresponding to the determined second inhalation pressure. For example, the user may view, on the display 120, a screen on which the additional image 620 corresponding to the determined second inhalation pressure overlaps a scene 600b in reality.

The additional image 610 corresponding to the first inhalation pressure and the additional image 620 corresponding to the second inhalation pressure may include different graphic objects. For example, the additional image 610 corresponding to the first inhalation pressure and the additional image 620 corresponding to the second inhalation pressure may each include a graphic object depicting cigarette smoke, but the characteristics (e.g., the amount of cigarette smoke and/or the shape of cigarette smoke) of cigarette smoke may be different from each other. That is, the additional image 620 when the user inhales relatively strongly through the mouthpiece part of the smokeless inhalation instrument 200 may include the shape of cigarette smoke that is larger and more abundant than the additional image 610 when the user inhales relatively lightly.

In one embodiment, the electronic device 100 may receive, from the smokeless inhalation instrument 200, data on an inhalation duration as the data on the degree of inhalation by the user, may generate image data corresponding to the received data on the inhalation duration, and may output the image data on the display 120.

For example, the data on the degree of inhalation received by the electronic device 100 from the smokeless inhalation instrument 200 may include a first inhalation duration (e.g., 1 second). That is, as the user inhales through a mouthpiece part of the smokeless inhalation instrument 200, the smokeless inhalation instrument 200 may sense the start of inhalation by the user through a pressure sensor or a capacitor sensor included in the smokeless inhalation instrument 200. Thereafter, the smokeless inhalation instrument 200 may determine that the first inhalation duration is 1 second, by measuring one inhalation duration of the user through a timer included in the smokeless inhalation instrument 200. In this case, the first inhalation duration may be an inhalation duration detected when the user inhales for a relatively short time through the mouthpiece part of the smokeless inhalation instrument 200.

The electronic device 100 may determine image data corresponding to the first inhalation duration. For example, the electronic device 100 may generate the image data corresponding to the first inhalation duration based on data pre-stored in a memory. In this case, image data corresponding to an inhalation duration in the smokeless inhalation instrument 200 may be pre-stored in the memory of the electronic device 100. Thereafter, the electronic device 100 may provide the additional image 610 to the user by outputting, on the display 120, the image data corresponding to the determined first inhalation duration. For example, the user may view, on the display 120, a screen on which the additional image 610 corresponding to the determined first inhalation duration overlaps the scene 600a in reality.

For example, the data on the degree of inhalation received by the electronic device 100 from the smokeless inhalation instrument 200 may include a second inhalation duration (e.g., 2 seconds). That is, as the user inhales through a mouthpiece part of the smokeless inhalation instrument 200, the smokeless inhalation instrument 200 may sense the start of inhalation by the user through a pressure sensor or a capacitor sensor included in the smokeless inhalation instrument 200. Thereafter, the smokeless inhalation instrument 200 may determine that the second inhalation duration is 2 seconds, by measuring one inhalation duration of the user through a timer included in the smokeless inhalation instrument 200. In this case, the second inhalation duration may be an inhalation duration detected when the user inhales for a relatively long time through the mouthpiece part of the smokeless inhalation instrument 200.

The electronic device 100 may determine image data corresponding to the second inhalation duration. For example, the electronic device 100 may generate the image data corresponding to the second inhalation duration based on data pre-stored in the memory. Thereafter, the electronic device 100 may provide the additional image 620 to the user by outputting, on the display 120, the image data corresponding to the determined second inhalation duration. For example, the user may view, on the display 120, a screen on which the additional image 620 corresponding to the determined second inhalation duration overlaps the scene 600b in reality.

The additional image 610 corresponding to the first inhalation duration and the additional image 620 corresponding to the second inhalation duration may include different graphic objects. For example, the additional image 610 corresponding to the first inhalation duration and the additional image 620 corresponding to the second inhalation duration may each include a graphic object depicting cigarette smoke, but the characteristics (e.g., the amount of cigarette smoke and/or the shape of cigarette smoke) of cigarette smoke may be different from each other. That is, the additional image 620 when the user inhales for a relatively long time through the mouthpiece part of the smokeless inhalation instrument 200 may include the shape of cigarette smoke that is larger and more abundant than the additional image 610 when the user inhales for a relatively short time.

Figure 7:
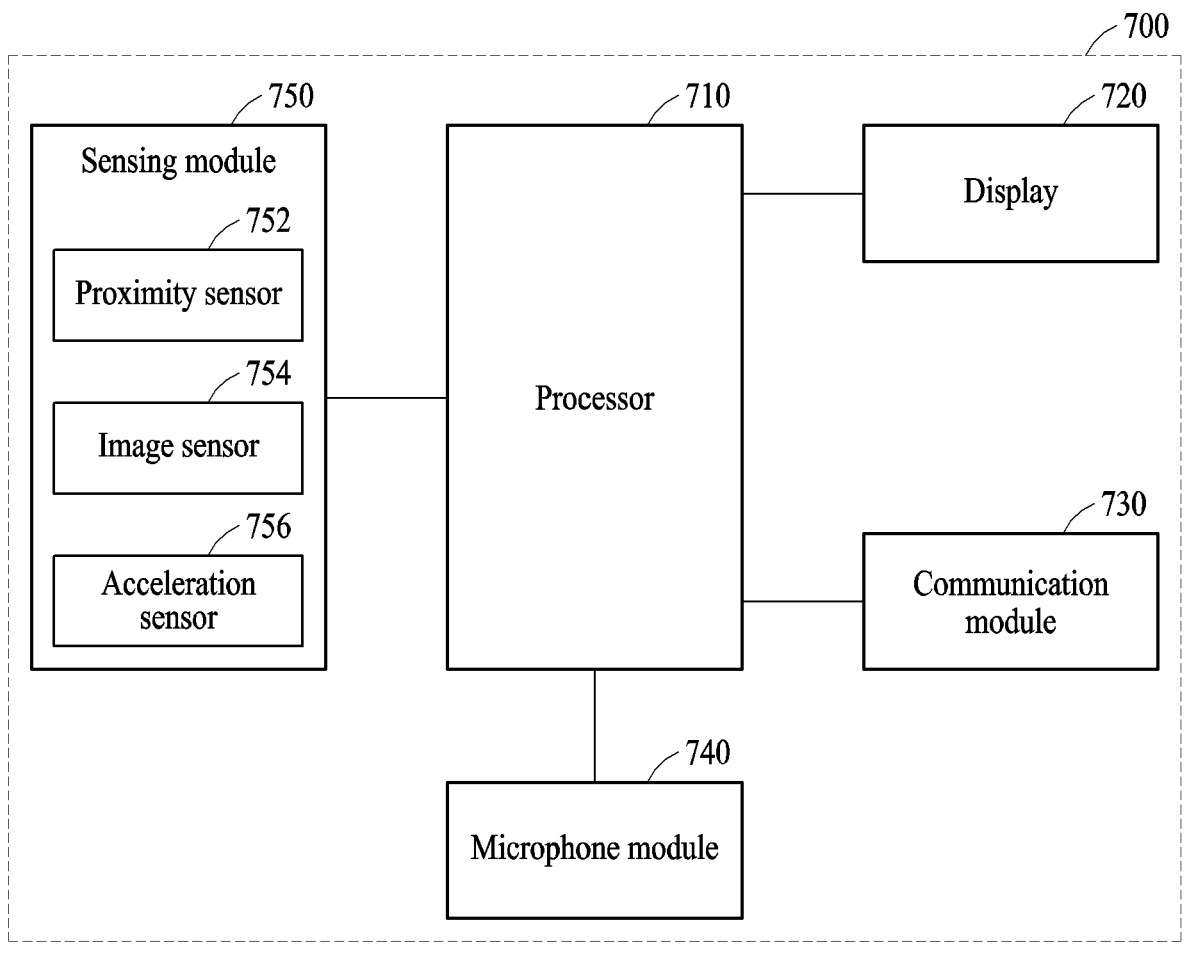
FIG. 7 is a block diagram of an electronic device according to another example.

FIG. 7 is a block diagram of an electronic device according to another example.

According to one embodiment, an electronic device 700 may include a processor 710, a display 720, a communication module 730, a microphone module 740, and a sensing module 750. Because the electronic device 700 of FIG. 7 may correspond to the electronic device 100 of FIG. 2, detailed descriptions of the processor 710, the display 720, and the communication modules 730 of FIG. 7 may respectively correspond to the detailed descriptions of the processor 110, the display 120, and the communication module 130 of FIG. 1.

The microphone module 740 may obtain audio data from the outside. For example, the microphone module 740 may obtain external audio data and may convert the obtained audio data into an electrical signal.

According to one embodiment, when a preset condition is satisfied, the processor 710 may switch the microphone module 740 from an inactive state to an active state. For example, the preset condition may be satisfied when the electronic device 700 receives data on a smoking event from the smokeless inhalation instrument 200. That is, when the electronic device 700 receives data (e.g., data on a pressure change, data on an inhalation duration of a user, and the like) on a smoking event from the smokeless inhalation instrument 200, the processor 710 may switch the microphone module 740 from an inactive state to an active state.

According to one embodiment, the sensing module 750 may include at least one sensor for sensing an external environmental status or an operating status of the electronic device 700 and generating an electrical signal or a data value corresponding to the sensed status. For example, the sensing module 750 may include a proximity sensor 752, an image sensor 754, and an acceleration sensor 756.

According to one embodiment, the processor 710 may sense proximity of an external device (e.g., the smokeless inhalation instrument 200) through the proximity sensor 752. The processor 710 may output image data corresponding to the smoking event on the display 720 based on the proximity of the smokeless inhalation instrument 200 and the data on the smoking event received from the smokeless inhalation instrument 200 through the communication module 730.

According to one embodiment, the processor 710 may sense a change in the lip shape of the user through the image sensor 754. That is, to obtain the lip shape of the user wearing the electronic device 700, the image sensor 754 may be disposed on an area of a lower area of a face plate (e.g. the face plate 101 of FIG. 1) of the electronic device 700. The processor 710 may generate image data corresponding to the smoking event based on the change in the lip shape of the user and the data on the smoking event received from the smokeless inhalation instrument 200 through the communication module 730.

Acceleration to one embodiment, the processor 710 may sense movement of the electronic device 700 through the acceleration sensor 756. The processor 710 may generate image data corresponding to the smoking event through the display 720 based on the movement of the electronic device 700 and the data on the smoking event received from the smokeless inhalation instrument 200 through the communication module 730.

Figure 8:
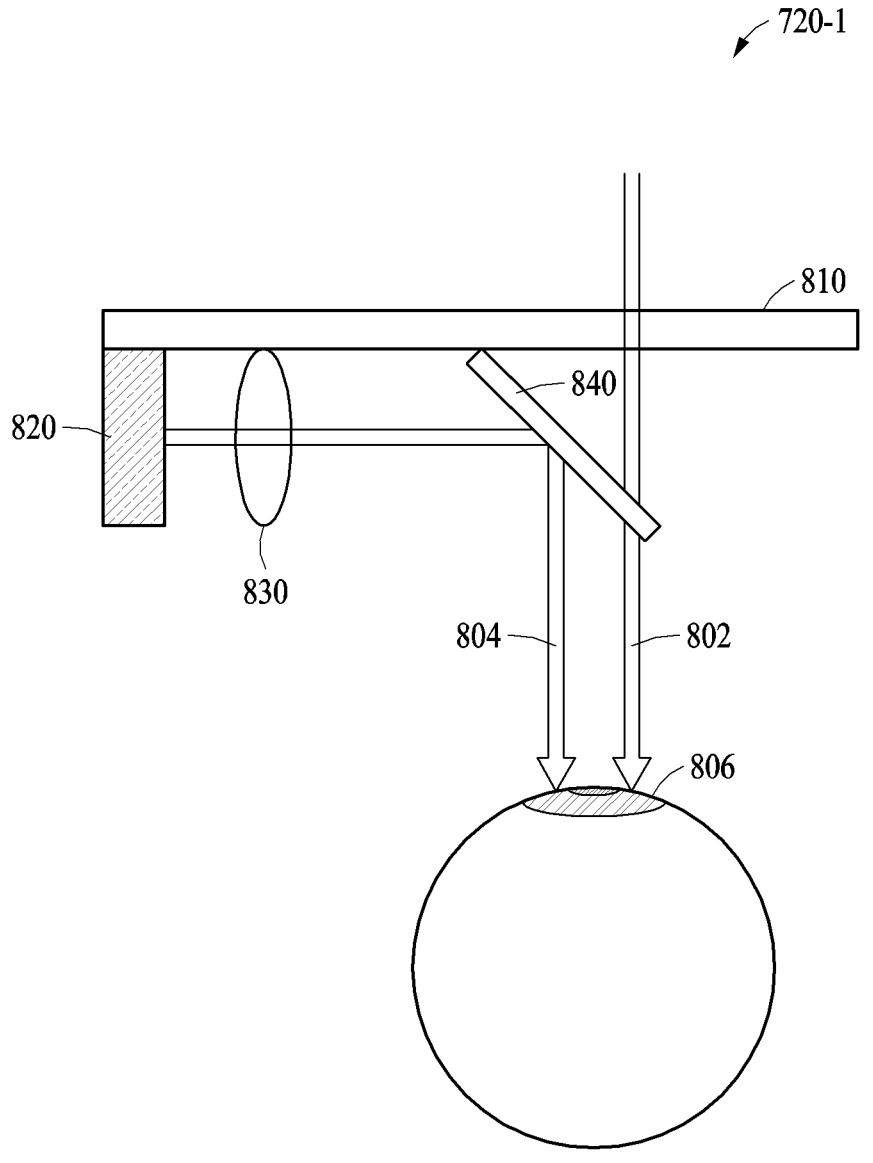
FIG. 8 illustrates a method of providing an additional image to a user through a display, according to an example.

FIG. 8 illustrates a method of providing an additional image to a user through a display, according to an example.

According to one embodiment, a display 720-1 of the electronic device 700 described with reference to FIG. 7 may include a glass 810, a beam output device 820, and at least one lens 830 and a half mirror 840. For example, the processor 710 of the electronic device 700 may output image data through the beam output device 820. As the beam output by the beam output device 820 is provided to an eye 806 of a user through the lens 830 and the half mirror 840, the user may be provided with an additional image 804. Simultaneously, a real scene 802 may be provided to the eye 806 of the user. In other words, an optical path of the additional image 804 that appears due to the output of the image data and an optical path of the real scene 802 passing through the display 720-1 may correspond to each other. Accordingly, the user may overlap and observe the real scene 802 with the additional image 804.

Figure 9:
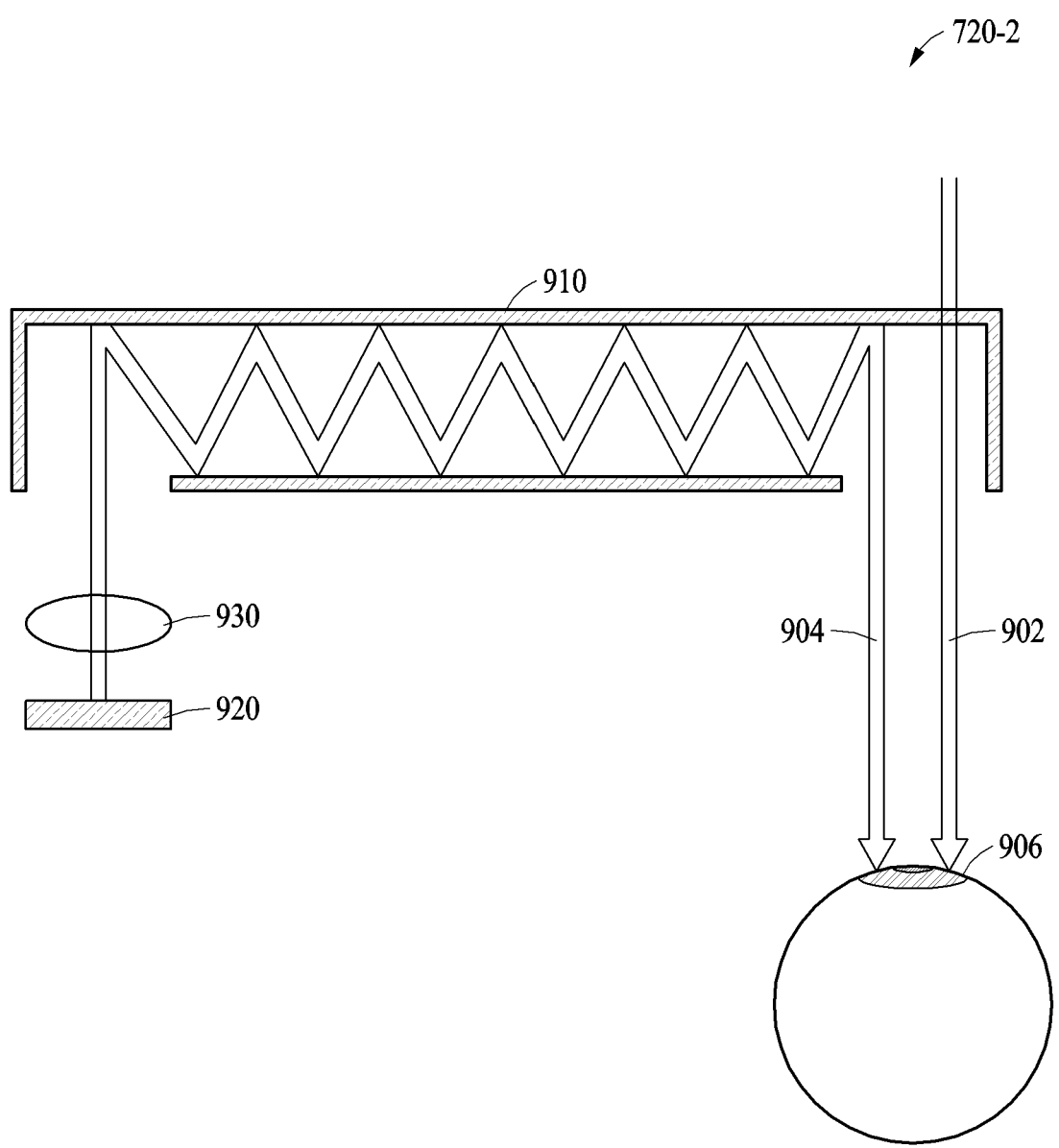
FIG. 9 illustrates a method of providing an additional image to a user through a display, according to an example.

FIG. 9 illustrates a method of providing an additional image to a user through a display, according to an example.

According to one embodiment, a display 720-2 of the electronic device 700 described with reference to FIG. 7 may include an optical waveguide 910, a beam output device 920, and at least one lens 930. For example, the display 720-2 may include an exit pupil expander (EPE) device.

The processor 710 of the electronic device 700 may output image data through the beam output device 920. A beam output by the beam output device 920 may proceed through the lens 930 and the optical waveguide 910. As the beam proceeding through the optical waveguide 910 is provided to an eye 906 of a user, the user may be provided with an additional image 904. Simultaneously, a real scene 902 may be provided to the eye 906 of the user. In other words, an optical path of the additional image 904 that appears due to the output of the image data and an optical path of the real scene 902 passing through the display 720-2 may correspond to each other. Accordingly, the user may observe the real scene 902 overlapped with the additional image 904.

Figure 10:
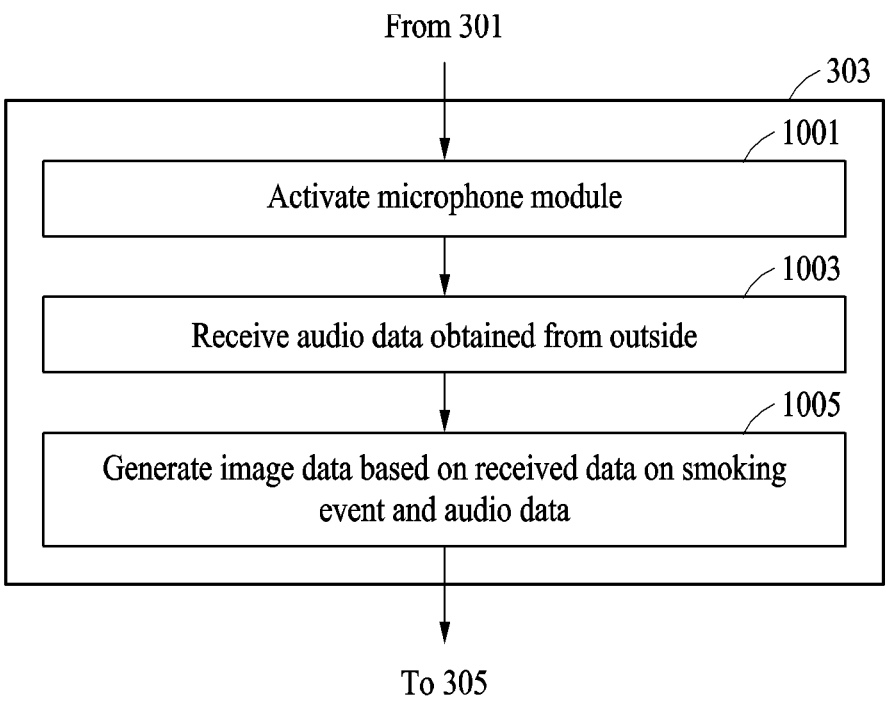
FIG. 10 illustrates a flowchart of a method of generating image data based on audio data, according to an example.

FIG. 10 illustrates a flowchart of a method of generating image data based on audio data, according to an example.

According to one embodiment, operation 303 described above with reference to FIG. 3 may include operations 1001, 1003, and 1005. Operations 1001, 1003, and 1005 may be performed by the processor 110 of the electronic device 100 of FIG. 1 or the processor 710 of the electronic device 700 of FIG. 7.

In operation 1001, the processor 710 of the electronic device 700 may switch a microphone module (e.g., the microphone module 740 of FIG. 7) from an inactive state to an active state. For example, when a preset condition is satisfied, the processor 710 may switch the microphone module 740 from an inactive state to an active state. In this case, the preset condition may be satisfied when data on a smoking event is received from a smokeless inhalation instrument (e.g., the smokeless inhalation instrument 200 of FIG. 2), a communication link is established with the smokeless inhalation instrument 200, and/or a user input for activating the microphone module 740 is received.

In operation 1003, the processor 710 of the electronic device 700 may receive audio data obtained from the outside through the microphone module 740. For example, the audio data may include a sound signal corresponding to inhalation by the user inhaling through a mouthpiece part of the smokeless inhalation instrument 200 and/or a sound signal corresponding to exhalation immediately after the inhalation.

According to one embodiment, the microphone module 740 may further include an analog to digital converter (ADC) for converting a sound signal, which is an analog signal, obtained from the outside into a digital signal. For example, the ADC of the microphone module 740 may convert a sound signal corresponding to inhalation and/or exhalation by the user, obtained from the outside, into a digital signal, and the processor 710 of the electronic device 700 may store the converted digital signal in a memory. In this case, the ADC may convert the sound signal corresponding to inhalation and/or exhalation by the user, obtained from the outside, into a digital signal through a series of steps, such as sampling, quantization, and encoding. Thereafter, when the audio data is received through the microphone module 740, the processor 710 of the electronic device 700 may determine whether the received audio data includes a sound signal corresponding to inhalation by the user or includes a sound signal corresponding to exhalation based on the digital signal stored in the memory.

In operation 1005, the processor 710 of the electronic device 700 may output image data based on the audio data and the received data on the smoking event.

Herein, the "data on the smoking event" may be data on a pressure change in the smokeless inhalation instrument 200 as the user inhales smokeless tobacco through the smokeless inhalation instrument 200. In addition, herein, the "audio data" may include a sound signal corresponding to inhalation and/or a sound signal corresponding to exhalation by a smoker.

For example, when data on a pressure change that is greater than a preset threshold value is received from the smokeless inhalation instrument 200 and audio data including a sound signal corresponding to inhalation by the user is received from the microphone module 740, the processor 710 of the electronic device 700 may output image data on the display 720. In this case, the image data may be determined based on the pressure change value received from the smokeless inhalation instrument 200 and the sound signal received from the microphone module 740.

For example, when data on a pressure change that is greater than a preset threshold value is received from the smokeless inhalation instrument 200, the processor 710 of the electronic device 700 may generate image data to output on the display 720. Thereafter, when audio data including a sound signal corresponding to exhalation by the user is received from the microphone module 740, the processor 710 of the electronic device 700 may output the image data on the display 720 from the timepoint when the audio data is received.

Figure 11:
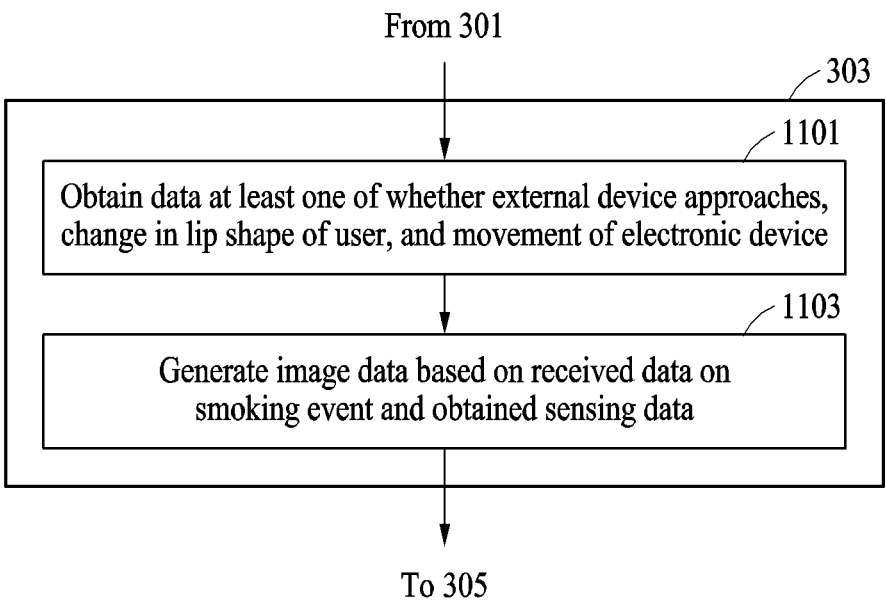
FIG. 11 illustrates a flowchart of a method of generating image data based on a shape of a lip shape of a user, according to an example.

FIG. 11 illustrates a flowchart of a method of generating image data based on a shape of a lip shape of a user, according to an example.

According to one embodiment, operation 303 described with reference to FIG. 3 may include operations 1101 and 1103. Operations 1101 and 1103 may be performed by the processor 110 of the electronic device 100 of FIG. 1 or the processor 710 of the electronic device 700 of FIG. 7.

In operation 1101, the processor 710 of the electronic device 700 may obtain data about at least one of proximity of the smokeless inhalation instrument 200, a change in the lip shape of the user, and movement of the smokeless inhalation instrument 200 through the sensing module 750.

For example, the processor 710 of the electronic device 700 may obtain data on whether the smokeless inhalation instrument 200 approaches the electronic device 700 through a proximity sensor (e.g., the proximity sensor 752 of FIG. 7). That is, if the user is wearing the electronic device 700, the processor 710 of the electronic device 700 may detect a smoking event by the user based on the smokeless inhalation instrument 200 approaching the electronic device 700.

For example, the processor 710 of the electronic device 700 may obtain data on the change of the lip shape of the user through the image sensor 754. That is, when the user wears the electronic device 700, the processor 710 of the electronic device 700 may determine that a smoking operation is performed by the user based on that the lip shape of the user changes to a predetermined shape (e.g., the shape of lips when making the sound of "o").

For example, the processor 710 of the electronic device 700 may obtain data on movement of the electronic device 700 through the acceleration sensor 756. That is, when the user wears the electronic device 700, the processor 710 of the electronic device 700 may detect a smoking event by the user based on the movement of the user wearing the electronic device 700 being detected.

In operation 903, the processor 710 of the electronic device 700 may generate image data based on the received data on the smoking event and the obtained sensing data.

For example, when data on a pressure change that is greater than a preset threshold value is received from the smokeless inhalation instrument 200 and at least one sensing data of proximity of the smokeless inhalation instrument 200, the change in the lip shape of the user, and the movement of the electronic device 700 is received from the sensing module 750, the processor 710 of the electronic device 700 may output image data on the display 720. In this case, the image data may be generated based on the pressure change value received from the smokeless inhalation instrument 200 and the sensing data received from the sensing module 750.

Figure 12A:
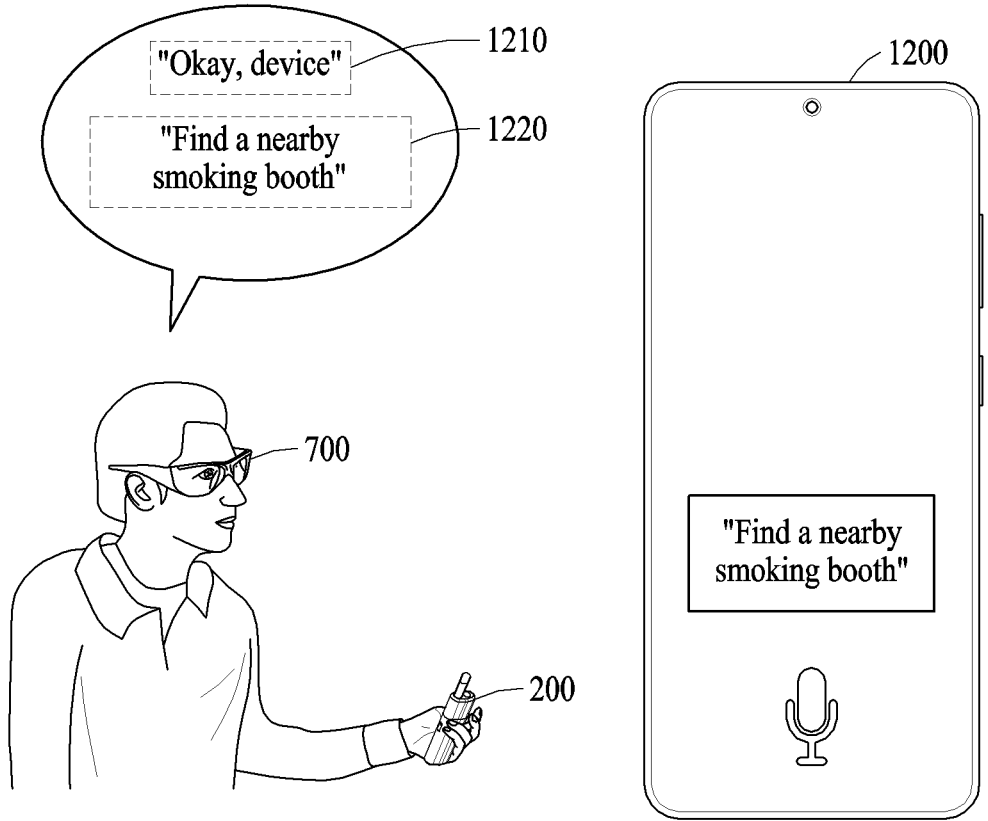
FIG. 12A illustrates an example of an electronic device searching for a place based on speech recognition according to an example.
Figure 12B:
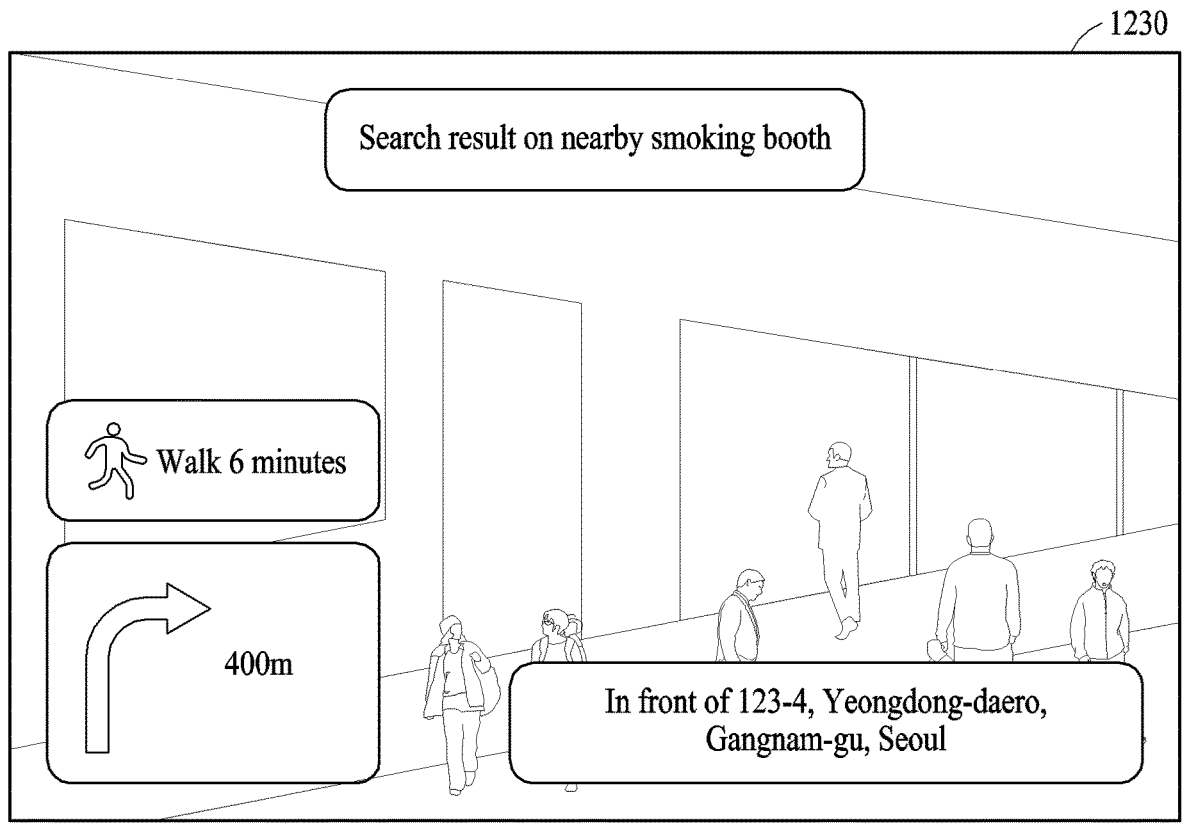
FIG. 12B illustrates an example of a display of the electronic device of FIG. 12A that displays the place search result.

FIG. 12A illustrates an example of an electronic device searching for a place based on speech recognition according to an example. FIG. 12B illustrates an example of a display of the electronic device of FIG. 12A that displays the place search result.

Referring to FIG. 12A, the electronic device 700, the smokeless inhalation instrument 200, and a user terminal device 1200 may connect and communicate via a communication interface. For example, the communication module 730 of the electronic device 700 may be connected to a network via wireless communication or wired communication and may communicate with the smokeless inhalation instrument 200 and/or the user terminal device 1200.

In one embodiment, the electronic device 700 may perform speech recognition through the microphone module 740. For example, the processor 710 of the electronic device 700 may preset predetermined speech (e.g., "Okay, device") as a wake-up command 1210 for activating a separate speech recognition processor. Thereafter, when the speech, "Okay, device", is input to the microphone module 740, the processor 710 may determine that the received speech corresponds to the preset speech and may activate the speech recognition processor.

In one embodiment, the processor 710 of the electronic device 700 may preset, to the user terminal device 1200, predetermined speech (e.g., "near," "surrounding", "where", "find", and "tell") as a command for requesting map data. Thereafter, when speech, "Find a nearby smoking booth" 1220 is input to the microphone module 740, the processor 710 of the electronic device 700 may determine whether the input speech includes the preset command. When the processor 710 of the electronic device 700 determines that the input speech includes the preset command, the processor 710 of the electronic device 700 may request the user terminal device 1200 for map data through the communication module 730.

Referring to FIG. 12B, the processor 710 of the electronic device 700 may generate image data including the place search result through the display 720. For example, the user may view, on the display 720, a screen 1230 in which the map data received from the user terminal device 1200 overlaps a real scene. In this case, the map data received from the user terminal device 1200 may be data shared by the user terminal device 1200 through a mirroring technique. For example, the map data received from the user terminal device 1200 may be shared map data obtained through an application (e.g., a navigation application) of the user terminal device 1200.

Figure 13A:
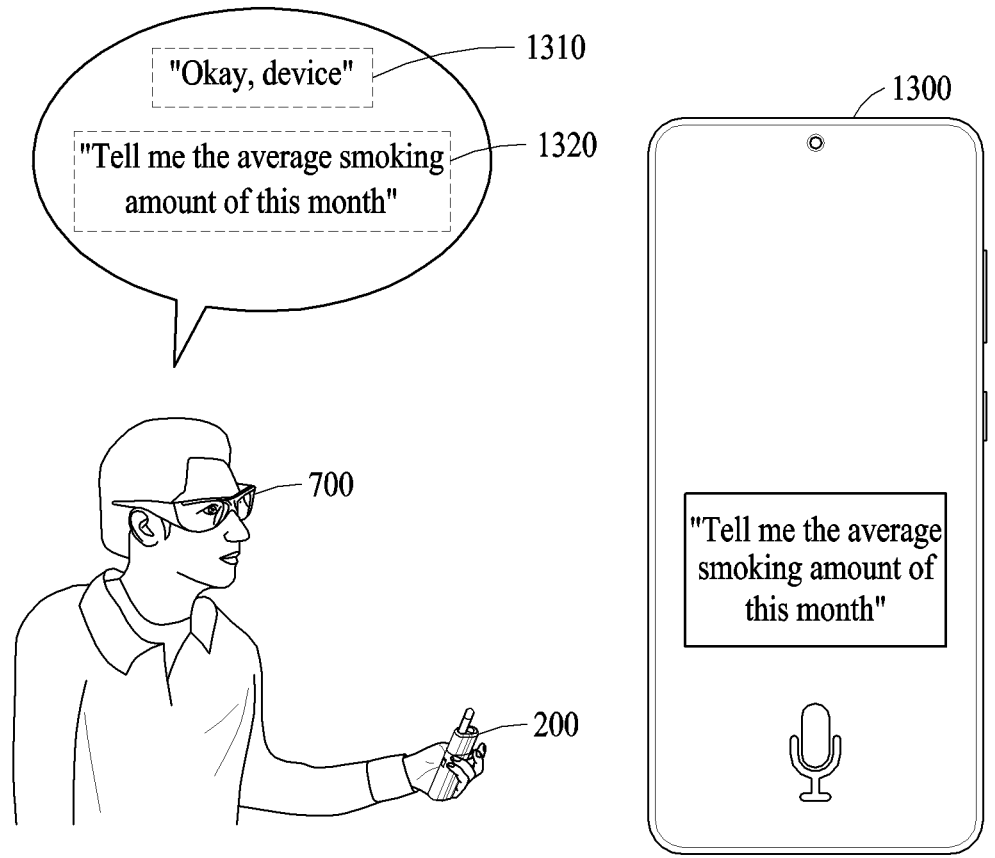
FIG. 13A illustrates an example of an electronic device receiving an inquiry about the average amount of smoking based on speech recognition according to an example.
Figure 13B:
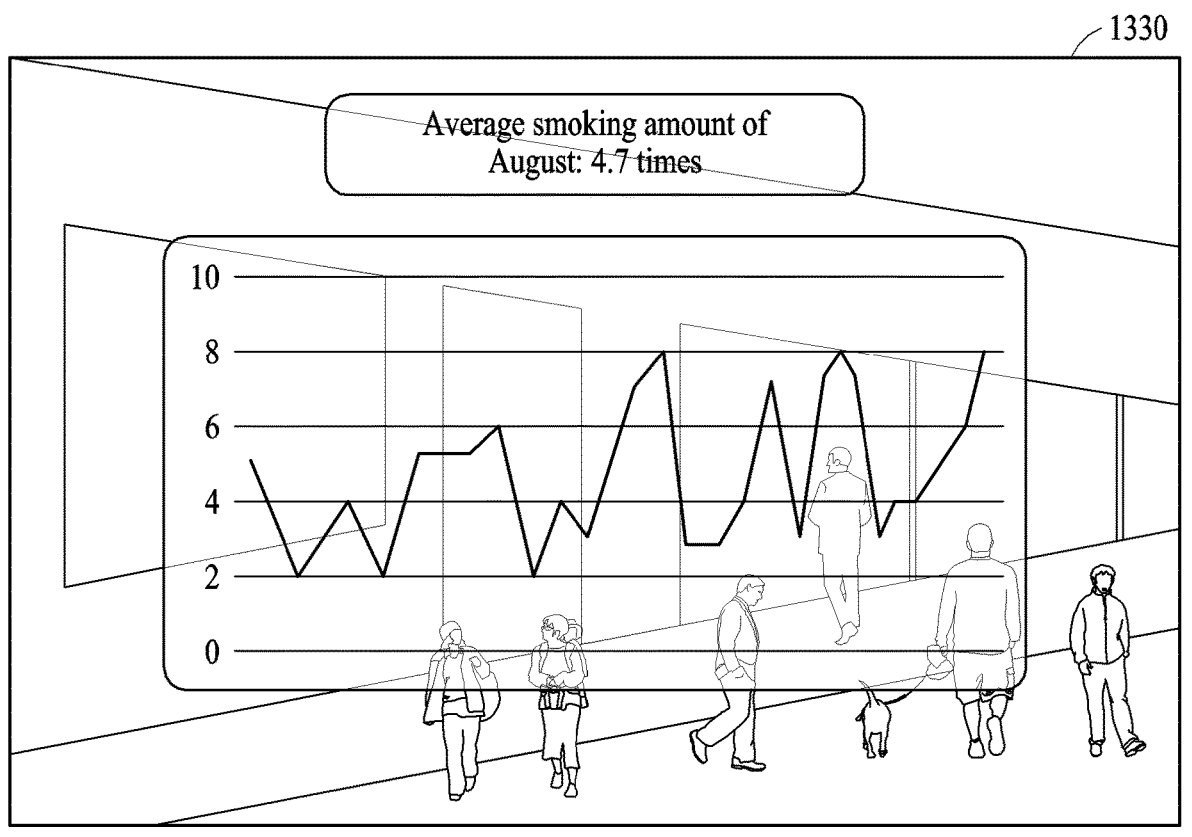
FIG. 13B illustrates an example of the electronic device of FIG. 13A displaying the average amount of smoking.

FIG. 13A illustrates an example of an electronic device receiving an inquiry about an average amount of smoking based on speech recognition according to an example. FIG. 13B illustrates an example of the electronic device of FIG. 13A displaying the average amount of smoking.

Referring to FIG. 13A, the electronic device 700, the smokeless inhalation instrument 200, and a user terminal device 1300 may connect and communicate via a communication interface. For example, the communication module 730 of the electronic device 700 may be connected to a network via wireless communication or wired communication and may communicate with the smokeless inhalation instrument 200 and/or the user terminal device 1300.

In one embodiment, the electronic device 700 may perform speech recognition through the microphone module 740. For example, the processor 710 of the electronic device 700 may preset predetermined speech (e.g., "Okay, device") as a wake-up command 1310 for activating a separate speech recognition processor. Thereafter, when the speech, "Okay, device", is input to the microphone module 740, the processor 710 may determine that the received speech corresponds to the preset speech and may activate the speech recognition processor.

In one embodiment, the processor 710 of the electronic device 700 may preset predetermined speech (e.g., "this month", "today", "average", "smoking amount", or "tell") as a command for requesting the user terminal device 1300 for at least one of average smoking amount data and current smoking amount data. Thereafter, when speech, "tell me the average smoking amount for this month" 1320 is input to the microphone module 740, the processor 710 of the electronic device 700 may determine whether the input speech includes the preset command. When the processor 710 of the electronic device 700 determines that the input speech includes the preset command, the processor 710 of the electronic device 700 may request the user terminal device 1300 for at least one of average smoking amount data and current smoking amount data through the communication module 730.

Referring to FIG. 13B, the processor 710 of the electronic device 700 may display image data including the average smoking amount data through the display 720. For example, the user may view, on the display 720, a screen 1330 in which the average smoking amount data received from the user terminal device 1300 overlaps a real scene. In this case, the average smoking amount data received from the user terminal device 1300 may be data shared by the user terminal device 1300 through a mirroring technique. For example, the average smoking amount data received from the user terminal device 1300 may be shared smoking amount data obtained through an application (e.g., a smoking habit monitoring application) of the user terminal device 1300.

Figure 14A:
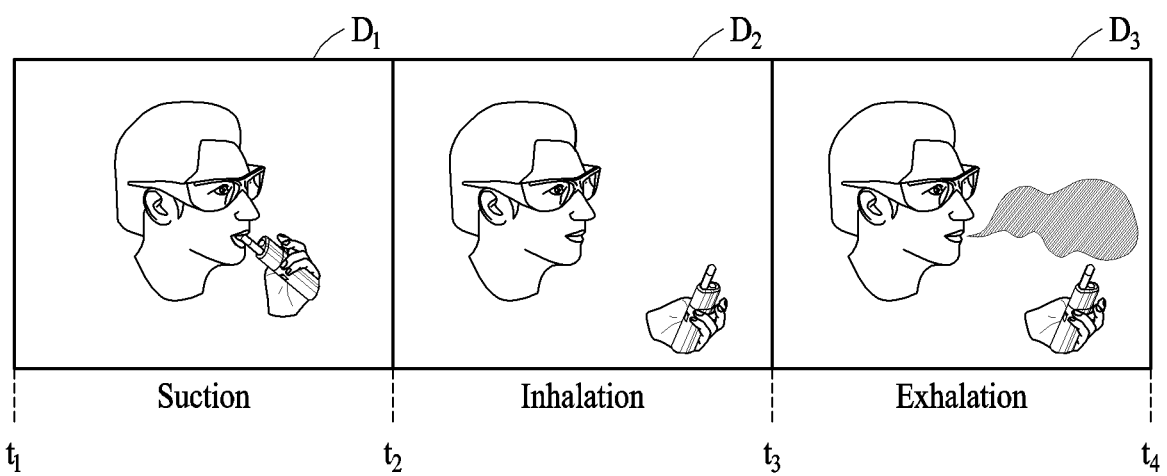
FIG. 14A illustrates a user's smoking action of divided into intervals according to an example.

FIG. 14A illustrates a smoking action of a user divided into intervals according to an example.

According to one embodiment, a user may perform a smoking action from timepoint $t_1$ to timepoint $t_4$.

Referring to FIG. 14A, a user in one embodiment may suck a smokable substance (e.g., an aerosol) from an external device (e.g., the smokeless inhalation instrument 200 of FIG. 2) in an interval $D_1$ between the timepoint $t_1$ to the timepoint $t_4$. The smokeless inhalation instrument 200 may generate an aerosol in various manners. Hereinafter, a motion of the user in the interval $D_1$ may be referred to as a "smoke suction" motion, and the user may collect the smokable substance (e.g., aerosol) in the mouth through the smoke suction motion from the smokeless inhalation instrument 200. In the interval $D_1$, the user and one side (e.g., an intake or a mouthpiece) of the smokeless inhalation instrument 200 may be in contact with each other.

According to one embodiment, the user may inhale the smokable substance collected in the mouth into lungs, in the interval $D_2$ between the timepoint $t_2$ and the timepoint $t_3$. Hereinafter, the motion of the user in the interval $D_2$ may be referred to as an "inhalation" motion (or "inhalation and hand-down" motion), and the user may separate the one side of the smokeless inhalation instrument 200 from the lips and may lower the hand while inhaling. In the interval $D_2$, the user and the smokeless inhalation instrument 200 may be separated.

According to an embodiment, the user may exhale the inhaled smokable substance in the interval $D_3$ between timepoint $t_3$ and the timepoint $t_4$. Hereinafter, the motion of the user in the interval $D_3$ may be referred to as an "exhalation" motion.

According to an embodiment, the length of the interval $D_2$ (the inhalation time) may be estimated based on the length of the interval $D_1$ (the smoke suction time). As an example, the length of the interval $D_2$ (the inhalation time) may be proportional to the length of the interval $D_1$ (the smoke suction time). For example, if the smoke suction time is "1" second, the inhalation time may be "1" second. If the smoke suction time is "3" seconds, the inhalation time may also be "3" seconds. Alternatively, an inhalation time corresponding to a smoke suction time may be predicted using an artificial neural network. For example, an inhalation time corresponding to a smoke suction time may be predicted by inputting the smoke suction time into an artificial neural network trained based on pair training data of smoke suction times and inhalation times. However, the method of estimating the inhalation time based on the smoke suction time is not limited to the above example.

If it is possible to predict the length of the interval $D_2$ (the inhalation time), then it is also possible to predict $t_3$ (exhalation start timepoint). That is, the length of the interval $D_2$ may be predicted by measuring the length of the interval $D_1$ (the smoke suction time), and thus $t_3$ (the exhalation start timepoint) may be predicted by adding the predicted length of the interval $D_2$ to the measured length of the interval $D_1$.

According to an embodiment, the length of the interval $D_3$ (the exhalation time) may be determined based on at least one of the length of the interval $D_1$ (the smoke suction time) and the length of the interval $D_2$ (the inhalation time). For example, the length of the interval $D_3$ may be determined to be in proportion to the length of the interval $D_1$ or the length of the interval $D_2$. The timepoint ta may be predicted based on the predicted $t_3$ (the exhalation timepoint) and the length of the interval $D_3$.

According to an embodiment, the user may set information about the length of the interval $D_3$ in the electronic device 700 in advance. For example, the ratio of the length of the interval $D_3$ to the length of the interval $D_1$ or the length of the interval $D_2$ may be set by the user. When the user wants to maintain the output time of virtual smoke to be relatively long, the user may set the ratio to be large.

Figure 14B:
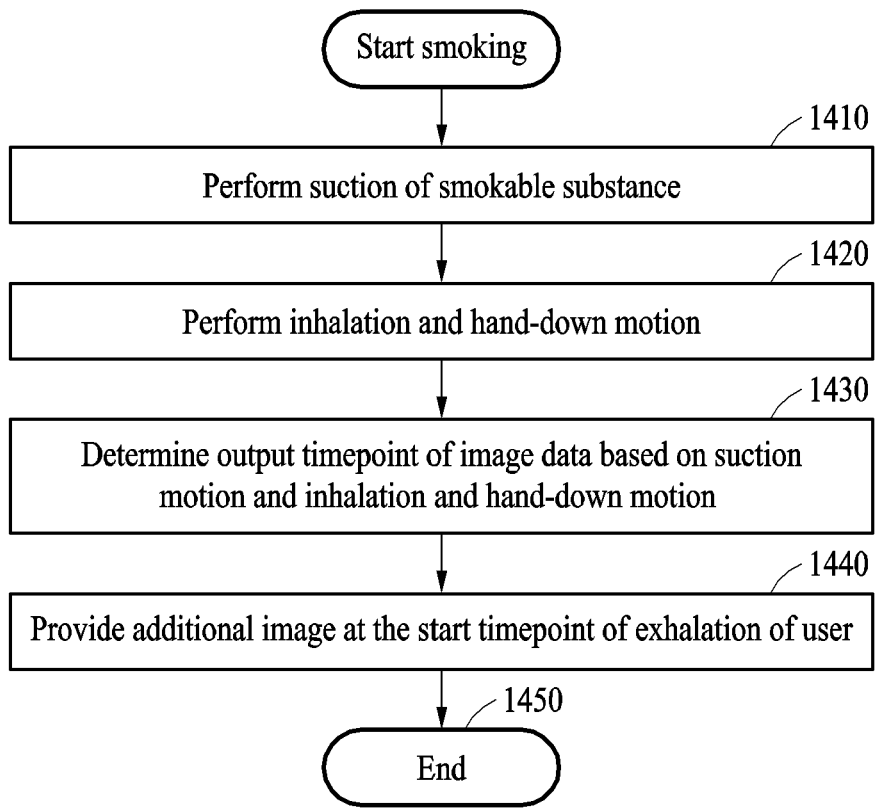
FIG. 14B illustrates a flowchart of a method of determining an output timepoint of image data and providing an additional image, according to an example.

FIG. 14B illustrates a flowchart of a method of determining an output timepoint of image data and providing an additional image, according to an example.

In a virtual smoking system according to one embodiment, a user may experience VR or AR by integrating smoking through an external device (e.g., the smokeless inhalation instrument 200) in the real world with an electronic device (e.g., the electronic device 700 of FIG. 7). More specifically, the electronic device 700 in one embodiment may implement virtual smoke without a sense of difference by implementing virtual smoke in a virtual space at the timepoint when the user exhales during smoking on the smokeless inhalation instrument 200.

The user in one embodiment may perform a smoking action by repeating motions $D_1$ to $D_3$ of FIG. 14A at least once, and the smokeless inhalation instrument 200 or the electronic device 700 may implement virtual smoke by sensing or predicting inhalation, exhalation, and inhalation of cigarette smoke of the user. Hereinafter, "implementing virtual smoke" may include determining at least one of the implementation timepoint, duration, and appearance (e.g., shape or color) of the virtual smoke.

Referring to FIG. 14B, in operation 1410, the user may draw a smokable substance from the smokeless inhalation instrument 200 into his or her mouth. The electronic device 700 may measure the time (e.g., $D_1$ of FIG. 14A) for which the user performs a smoke suction motion (i.e., an action of drawing a smokable substance from the smokeless inhalation instrument 200 into a mouth).

In operation 1420, after finishing a smoke suction motion, the user may perform an inhalation and hand-down motion. The electronic device 700 may measure the time (e.g., $D_2$ of FIG. 14A) for which the user performs an inhalation and hand-down motion.

In operation 1430, the electronic device 700 may predict the time for which the inhalation and hand-down motion is performed and the start timepoint of exhalation of the user (e.g., $t_3$ of FIG. 14A) based on the smoke suction time. The predicted start timepoint of exhalation by the user may be determined to be an output timepoint of image data.

In operation 1440, when the user starts the exhalation, the electronic device 700 may provide 1440 an additional image during the time for which the user exhales (e.g., $D_3$ of FIG. 14A). For example, the electronic device 700 may provide the additional image to the user by outputting the image data on the display 720 of the electronic device 700 from the determined output timepoint.

When a predetermined time has elapsed after the start of exhalation, the electronic device 700 may terminate 1450 providing of the additional image.

Figure 15:
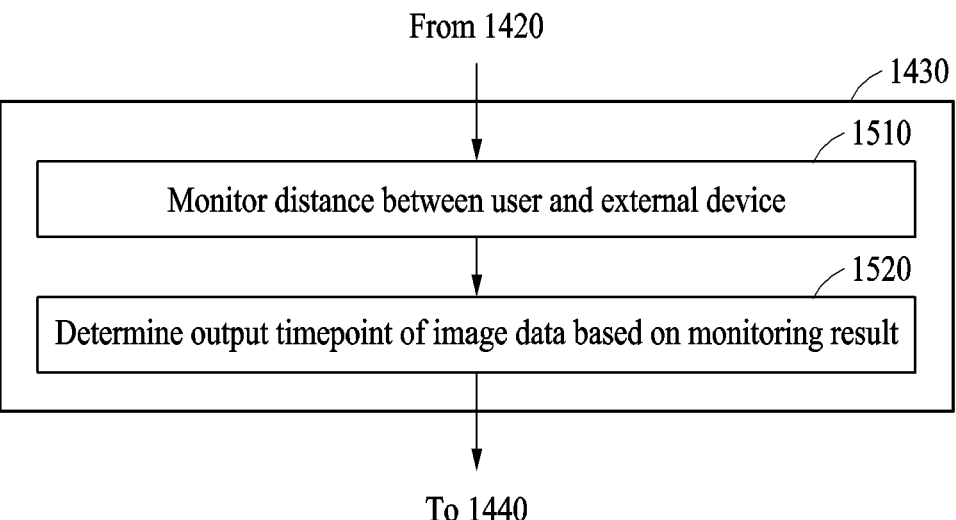
FIG. 15 illustrates a flowchart of a method of determining an output timepoint based on a distance between a user and an external device, according to an example.

FIG. 15 illustrates a flowchart of a method of determining an output timepoint based on a distance between a user and an external device, according to an example.

According to one embodiment, the sensor 210 of the smokeless inhalation instrument 200 may include a distance detection sensor. For example, the distance detection sensor may be an infrared sensor, a lidar sensor, or an ultrasonic sensor. However, the distance detection sensor of the present disclosure is not limited to the sensor stated above.

When a user in one embodiment starts smoking, the distance detection sensor may monitor the distance between a body part (e.g., the lips) of the user and the smokeless inhalation instrument 200. Data generated by the distance detection sensor may be transmitted to the electronic device 700. The electronic device 700 may determine the output timepoint of image data based on the monitoring result of the distance detection sensor. The electronic device 700 may provide an AR smoking experience to the user by providing an additional image to the user at a determined output timepoint.

According to one embodiment, operation 1430 described with reference to FIG. 14 may include the following operations 1510 and 1520.

In operation 1510, the electronic device 700 may monitor the distance between the user and the smokeless inhalation instrument 200. For example, the operation of monitoring the distance may include an operation of sensing a first timepoint at which the smokeless inhalation instrument 200 contacts a body part of the user and an operation of sensing a second timepoint at which the smokeless inhalation instrument 200 moves away from the body part of the user.

For example, the operation of sensing the first timepoint may include an operation of the distance detection sensor to sense that the smokeless inhalation instrument 200 approaches the body part of the user within a distance of a first threshold value.

For example, the operation of sensing the second timepoint may include an operation of the distance detection sensor to sense that the smokeless inhalation instrument 200 separates from the body part of the user by a distance more than a second threshold value after the smokeless inhalation instrument 200 contacts the body part of the user.

In operation 1520, the electronic device 700 may determine the output timepoint of the image data based on the monitoring result.

The first timepoint may be the timepoint at which the user starts a smoke suction motion. The interval between the first timepoint and the second timepoint may be the time for which the user draws the smokable substance from the smokeless inhalation instrument 200 into a mouth, and a first respiration time of the user may be predicted based on the smoke suction time. Here, the first respiration refers to an inhalation motion. The second timepoint may be the timepoint at which the user starts inhalation (i.e., an action of inhaling the smokable substance into lungs). The start timepoint of second respiration may be predicted based on the interval between the first timepoint and the second timepoint and the first respiration time. Here, the second respiration refers to an exhalation motion. That is, the start timepoint of second respiration may be the timepoint at which the user starts exhalation. For example, the start timepoint of second respiration may be determined to be the output timepoint of the image data.

According to an embodiment, since the smoke suction time of the user is the interval between the first timepoint and the second timepoint, the first respiration time, which is the time for which the user performs inhalation, may be estimated to be similar to the smoke suction time. Also, the electronic device 700 may predict the start timepoint of second respiration, which is the timepoint at which the user starts exhalation, to be the timepoint at which the first respiration time has elapsed from the second timepoint.

For example, when the duration between the first timepoint at which the smokeless inhalation instrument 200 contacts the body part of the user and the second timepoint at which the smokeless inhalation instrument 200 separates from the body part of the user is one second, the first respiration time may be estimated to be one second. Also, the time for which the user performs inhalation may also be predicted to be one second, which is similar to the first respiration time. Accordingly, the start timepoint of second respiration (i.e., exhalation) may be predicted to be one second after the body part of the user is separated from the smokeless inhalation instrument 200. Accordingly, the smokeless inhalation instrument 200 may determine the output timepoint of the image data to be one second after the time point at which the smokeless inhalation instrument 200 separates from the body part of the user.

According to one embodiment, operation 1520 may include an operation of estimating an intake volume and a respiration volume of the user based on an interval between the first timepoint and the second timepoint. The intake volume of the user may indicate an intake volume of an aerosol inhaled by the user through the smokeless inhalation instrument 200 while the smokeless inhalation instrument 200 contacts the body part of the user. The respiration volume of the user may indicate an inhalation volume of the user while the smokeless inhalation instrument 200 is not in contact with the body part of the user. The output timepoint of the image data may be predicted based on the estimated respiration volume and the intake volume.

Operation 1520 in one embodiment may include determining whether the smokeless inhalation instrument 200 satisfies a predetermined operating condition and determining the output timepoint of the image data based on determination that the smokeless inhalation instrument 200 satisfies the operating condition. For example, the predetermined operating condition may be satisfied when the user turns on the power of the smokeless inhalation instrument 200, or when a puff sensor or a pressure sensor included in the smokeless inhalation instrument 200 detects inhalation. The value sensed by the distance detection sensor may change due to a body part (e.g., a finger) other than a predetermined body part of the user, and the distance detection sensor may be configured to operate only when the user turns the power on, or the distance detection sensor may be configured to operate in response to sensing inhalation by the user through the puff sensor or the pressure sensor. However, a suction sensor of the present disclosure is not limited to a puff sensor or a pressure sensor.

Figure 16:
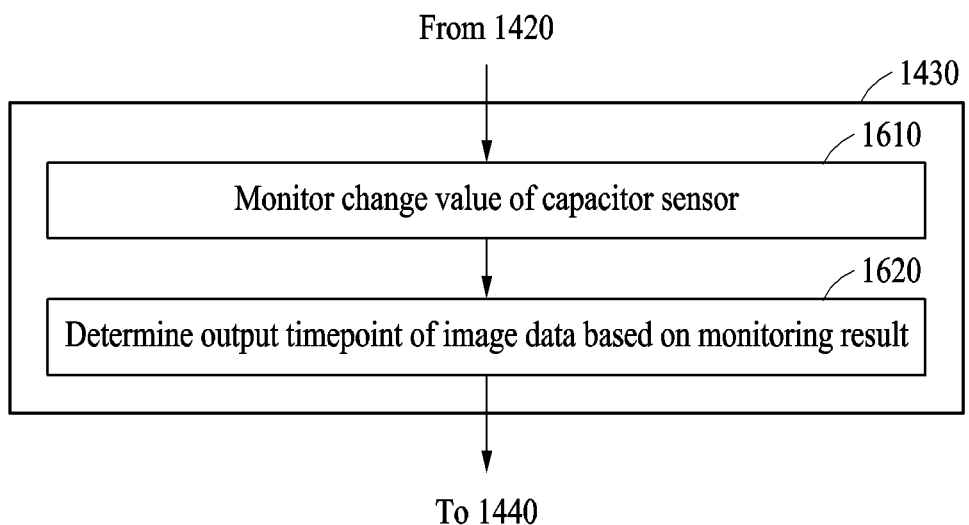
FIG. 16 illustrates a flowchart of a method of determining the output timepoint of image data based on a value of a capacitor sensor of an external device, according to an example.

FIG. 16 illustrates a flowchart of a method of determining an output timepoint of image data based on a value of a capacitor sensor of an external device, according to an example.

The sensor 210 of the smokeless inhalation instrument 200 in one embodiment may include a capacitor sensor. For example, the capacitor sensor may be a sensor configured based on a capacitor. However, the capacitor sensor of the present disclosure is not limited to the sensor stated above.

When the user in one embodiment starts smoking and the smokeless inhalation instrument 200 contacts a body part (e.g., the lips) of the user, the capacitor sensor may monitor the changed capacitance of the capacitor sensor. Data generated by the capacitor sensor may be transmitted to the electronic device 700. The electronic device 700 may determine the output timepoint of image data based on the monitoring result of the capacitor sensor. The electronic device 700 may provide an AR smoking experience to the user by providing an additional image to the user at a determined output timepoint.

According to one embodiment, operation 1430 described with reference to FIG. 14 may include the following operations 1610 and 1620.

In operation 1610, the electronic device 700 may monitor a change value of the capacitor sensor.

According to one embodiment, operation 1610 may include an operation of sensing a first timepoint at which the smokeless inhalation instrument 200 is in contact with the body part of the user (e.g., the lips) and an operation of sensing a second timepoint at which the body part of the user is separated from the smokeless inhalation instrument 200.

For example, the operation of sensing the first timepoint may include an operation of the capacitor sensor sensing that the capacitance reaches within a first threshold value when the body part of the user contacts the smokeless inhalation instrument 200. When the body part of the user (e.g., lips) touches the capacitor sensor, the capacitance may decrease under the first threshold value.

For example, the operation of sensing the second timepoint may include an operation of the capacitor sensor to sense that the capacitance exceeds a second threshold value sensed when the body part of the user is separated from the smokeless inhalation instrument 200.

In operation 1620, the electronic device 700 may determine the output timepoint of image data based on the monitoring result of the capacitance.

Figure 17:
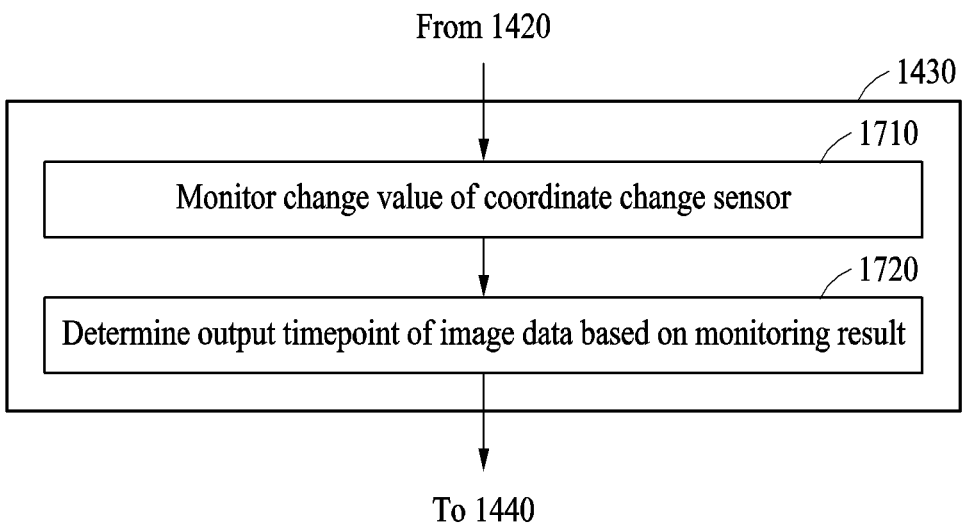
FIG. 17 illustrates a flowchart of a method of determining the output timepoint of image data based on a value of a coordinate change sensor of an external device, according to an example.

FIG. 17 illustrates a flowchart of a method of determining the output timepoint of image data based on a value of a coordinate change sensor of an external device, according to an example.

The smokeless inhalation instrument 200 in one embodiment may include a coordinate change sensor. For example, the coordinate change sensor may be a sensor such as a gyro sensor, an acceleration sensor, or a 3-degree of freedom (DOF)/6-DOF sensor. However, the coordinate change sensor of the present disclosure is not limited to the sensor stated above.

When a user in one embodiment starts smoking, the coordinate change sensor may monitor a coordinate change of the smokeless inhalation instrument 200. Data generated by the coordinate change sensor may be transmitted to the electronic device 700. The electronic device 700 may determine the output timepoint of image data based on the monitoring result of the coordinate change sensor. The electronic device 700 may provide an AR smoking experience to the user by providing an additional image to the user at a determined output timepoint.

According to one embodiment, operation 1430 described with reference to FIG. 14 may include the following operations 1710 and 1720.

In operation 1710, the electronic device 700 may include an operation of sensing a first timepoint at which the smokeless inhalation instrument 200 contacts the body part of the user and an operation of sensing a second timepoint at which the body part of the user is separated from the smokeless inhalation instrument 200.

For example, the operation of sensing the first timepoint may include an operation of the coordinate change sensor to sense that the smokeless inhalation instrument 200 approaches the body part of the user within first threshold coordinates and sense an acceleration change while the user brings the smokeless inhalation instrument 200 to the body part of the user.

For example, the operation of sensing the second timepoint may include an operation of the coordinate change sensor to sense that the body part of the user is separated from the smokeless inhalation instrument 200 by more than second threshold coordinates and sense an acceleration change while the user separates the smokeless inhalation instrument 200 from the body part of the user.

According to an embodiment, the coordinate change may be measured by comparing the x, y, and z-axis coordinates of the smokeless inhalation instrument 200 when the user is lowering their hand with the x, y, and z-axis coordinates of the smokeless inhalation instrument 200 when the user brings the smokeless inhalation instrument 200 into contact with the body part of the user. When the user moves a hand holding the smokeless inhalation instrument 200, the measured acceleration may increase and then decrease and stop. The coordinate change may be predicted by measuring an interval in which the acceleration changes, and a smoking time of the user may be estimated based on the predicted coordinate change.

In operation 1720, the electronic device 700 may determine the output timepoint of the image data based on a monitoring result.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape, optical media such as CD-ROM discs, DVDs, and/or Blue-ray discs, magneto-optical media such as optical discs, and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or uniformly instruct or configure the processing device to operate as desired. Software and data may be embodied permanently or temporarily in any type of machine, component, physical or pseudo equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. An electronic device comprising:
a communication module configured to perform communication with an external device;
a display; and
a processor electrically connected to the communication module and the display, wherein the processor is configured to receive data on a smoking event from the external device through the communication module, generate image data comprising at least one graphic object corresponding to the smoking event based on the data on the smoking event, and output the image data through the display, and
wherein the processor is further configured to:
determine a first timepoint corresponding to a start of an inhalation and at which a user of the electronic device performs a first motion,
determine a second timepoint corresponding to an end of the inhalation and at which the user performs a second motion after the first timepoint,
determine an output timepoint of the image data based on an interval between the first timepoint and the second timepoint, and
control the display to display an additional image by outputting the image data at the output timepoint.

2. The electronic device of claim 1, wherein an optical path of the additional image displayed by outputting the image data corresponds to an optical path of a real scene passing through the display.

3. The electronic device of claim 1, wherein the data on the smoking event comprises data on an acceleration change or a pressure change sensed by a sensor of the external device.

4. The electronic device of claim 1, further comprising:
a microphone module configured to obtain external audio data,
wherein the processor is further configured to:

22 when the data on the smoking event is received from the external device, activate the microphone module,
receive the external audio data obtained through the activated microphone module, and
generate the image data comprising the at least one graphic object corresponding to the smoking event based on the received data on the smoking event and the received external audio data.

5. The electronic device of claim 1, further comprising:
a sensing module comprising at least one sensor,
wherein the processor is further configured to:
obtain sensing data on at least one of whether the external device approaches, a change in a lip shape of a user of the electronic device, and movement of the electronic device through the sensing module, and
generate the image data comprising the at least one graphic object corresponding to the smoking event based on the data on the received smoking event and the obtained sensing data.

6. The electronic device of claim 1, wherein the processor is further configured to:
predict an inhalation duration based on the interval between the first timepoint and the second timepoint,
predict a start timepoint of exhalation based on the inhalation duration and the interval between the first timepoint and the second timepoint, and
determine the start timepoint of exhalation to be the output timepoint of the image data.

7. The electronic device of claim 1, wherein the display comprises:
a beam output device; and
a half mirror.

8. The electronic device of claim 1, wherein the display comprises:
an exit pupil expander (EPE) device.

9. The electronic device of claim 1, wherein the external device comprises an electronic cigarette.

10. A method of outputting an additional image, performed by an electronic device, the method comprising:
receiving data on a smoking event from an external device;
generating image data comprising at least one graphic object corresponding to the smoking event based on data on the received smoking event; and
displaying the additional image by outputting the image data on a display,
wherein the method further comprises:
determining a first timepoint corresponding to a start of an inhalation and at which a user of the electronic device performs a first motion,
determining a second timepoint corresponding to an end of the inhalation and at which the user performs a second motion after the first timepoint,
determining an output timepoint of the image data based on an interval between the first timepoint and the second timepoint, and
displaying the additional image by outputting the image data at the output timepoint.

* * * * *